(12) United States Patent
An et al.

(10) Patent No.: US 12,520,230 B2
(45) Date of Patent: Jan. 6, 2026

(54) ELECTRONIC DEVICE FOR TRANSMITTING AND/OR RECEIVING PROTOCOL/SERVICE INFORMATION, AND METHOD FOR OPERATING SAME

(71) Applicant: Samsung Electronics Co., Ltd., Suwon-si (KR)

(72) Inventors: Junhwan An, Suwon-si (KR); Mingu Kang, Suwon-si (KR); Suhyun Kim, Suwon-si (KR); Gyujin Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 400 days.

(21) Appl. No.: 18/334,623

(22) Filed: Jun. 14, 2023

(65) Prior Publication Data

US 2023/0328632 A1    Oct. 12, 2023

Related U.S. Application Data

(63) Continuation of application No. PCT/KR2021/019034, filed on Dec. 15, 2021.

(30) Foreign Application Priority Data

Jan. 13, 2021   (KR) .................. 10-2021-0004835

(51) Int. Cl.
*H04W 76/14* (2018.01)
*H04W 12/033* (2021.01)
*H04W 48/10* (2009.01)

(52) U.S. Cl.
CPC ......... *H04W 48/10* (2013.01); *H04W 12/033* (2021.01); *H04W 76/14* (2018.02)

(58) Field of Classification Search
CPC ... H04W 76/10; H04W 36/037; H04W 76/14; H04W 48/10; H04W 4/06; H04W 8/005;
(Continued)

(56) References Cited

U.S. PATENT DOCUMENTS 9,220,054 B2 * 12/2015 Gong ................. G06Q 30/0267
9,830,619 B2 * 11/2017 Lee .................... G06Q 30/0277
(Continued)

FOREIGN PATENT DOCUMENTS

JP   2020-042408 A    3/2020
JP   2020-127238 A    8/2020
(Continued)

OTHER PUBLICATIONS

International Search Report dated Mar. 8, 2022, issued in International Patent Application No. PCT/KR2021/019034.
(Continued)

*Primary Examiner* — Cindy Trandai
(74) *Attorney, Agent, or Firm* — Jefferson IP Law, LLP

(57) ABSTRACT

An electronic device for transmitting and/or receiving protocol/service information and a method for operating same are provided. The electronic device broadcasts an advertisement packet including at least one piece of first protocol/service information, receives a connection request packet including at least one piece of second protocol/service information from an external electronic device, and, when the at least one piece of second protocol/service information is the same as the at least one piece of first protocol/service information, transmits a connection response packet to the external electronic device.

20 Claims, 18 Drawing Sheets

(58) Field of Classification Search
CPC ....... H04W 4/50; H04W 12/03; G06F 3/1236; Y02D 10/00; Y02D 30/70; H04L 63/101; H04L 67/51

See application file for complete search history.

(56) References Cited

U.S. PATENT DOCUMENTS

| | | | |
|---|---|---|---|
| 2011/0117843 A1 | 5/2011 | Kim | |
| 2013/0157568 A1 | 6/2013 | Jain et al. | |
| 2014/0323048 A1* | 10/2014 | Kang | H04W 4/80 455/41.2 |
| 2016/0037483 A1* | 2/2016 | Du | H04W 4/06 370/252 |
| 2016/0100311 A1 | 4/2016 | Kumar | |
| 2017/0048656 A1 | 2/2017 | Kwon et al. | |
| 2017/0086098 A1 | 3/2017 | Kwon et al. | |
| 2017/0353979 A1* | 12/2017 | Lee | H04W 12/03 |
| 2018/0035294 A1* | 2/2018 | Reunamäki | H04W 12/08 |
| 2018/0077738 A1* | 3/2018 | Kim | H04W 76/14 |
| 2018/0124654 A1* | 5/2018 | Kim | H04L 67/1068 |
| 2018/0152979 A1* | 5/2018 | Lee | H04W 8/005 |
| 2019/0082038 A1 | 3/2019 | Ma et al. | |
| 2019/0141786 A1* | 5/2019 | Park | H04W 4/80 |
| 2019/0182647 A1 | 6/2019 | Qi et al. | |
| 2019/0239259 A1* | 8/2019 | Kunimatsu | G06F 3/1226 |
| 2019/0306711 A1* | 10/2019 | Golsch | H04W 4/80 |
| 2020/0084722 A1 | 3/2020 | Yoshimori et al. | |
| 2020/0100091 A1 | 3/2020 | Lee et al. | |
| 2020/0162876 A1 | 5/2020 | Stattenfield et al. | |
| 2021/0022192 A1 | 1/2021 | Benoni | |
| 2021/0127249 A1* | 4/2021 | Oh | H04W 4/80 |
| 2021/0373831 A1* | 12/2021 | Yu | G06F 3/1232 |
| 2021/0410201 A1* | 12/2021 | Kim | H04N 23/61 |
| 2023/0058549 A1* | 2/2023 | Menon | H04W 76/11 |
| 2023/0354444 A1* | 11/2023 | Kim | H04W 84/18 |

FOREIGN PATENT DOCUMENTS

| | | |
|---|---|---|
| JP | 2020-135070 A | 8/2020 |
| KR | 10-2011-0054835 A | 5/2011 |
| KR | 10-2013-0017435 A | 2/2013 |
| KR | 10-2016-0114671 A | 10/2016 |
| KR | 10-2016-0141759 A | 12/2016 |

OTHER PUBLICATIONS

Korean Office Action dated Apr. 7, 2025, issued in a Korean Patent Application No. 10-2021-0004835.

* cited by examiner

ELECTRONIC DEVICE FOR TRANSMITTING AND/OR RECEIVING PROTOCOL/SERVICE INFORMATION, AND METHOD FOR OPERATING SAME

CROSS-REFERENCE TO RELATED APPLICATION(S)

This application is a continuation application, claiming priority under § 365(c), of an International application No. PCT/KR2021/019034, filed on Dec. 15, 2021, which is based on and claims the benefit of a Korean patent application number 10-2021-0004835, filed on Jan. 13, 2021, in the Korean Intellectual Property Office, the disclosure of which is incorporated by reference herein in its entirety.

BACKGROUND

1. Field

The disclosure relates to an electronic device transmitting and/or receiving protocol/service information and a method for operating the same.

2. Description of Related Art

A Bluetooth low energy (BLE) scheme, which is one of short-range communication schemes, is capable of low-power and low-capacity data transmission and/or reception in a frequency band of about 2.4 gigahertz (GHz). Electronic devices using the BLE scheme may operate in an active mode only during a connection operation between the electronic devices and a data transmission and/or reception operation and may operate in a sleep mode during other times. Therefore, when the BLE scheme is used, power consumption of electronic devices may be reduced as compared to when a general Bluetooth scheme is used. Accordingly, the BLE scheme may be mainly used in electronic devices where power supply is limited, such as healthcare devices, sensor devices, or wearable electronic devices (e.g., BLE earphones, smart watches, or smart glasses).

Meanwhile, an electronic device using the BLE scheme may broadcast an advertisement packet for communication with an external electronic device. The external electronic device may recognize the electronic device that sent the advertisement packet based on the advertisement data (e.g., the address of the electronic device) included in the advertisement packet and request a connection to the recognized electronic device.

When the electronic device accepts the connection request, the external electronic device may obtain service list information from the electronic device by performing a service search operation for the electronic device. The external electronic device may select a service to be used based on the obtained service list information, and transmit and/or receive data packets for the selected service.

As an example, when the selected service includes characteristic information capable of a write operation, the external electronic device may transmit a data packet including data to be included in the characteristic information to the electronic device. As another example, when the selected service includes characteristic information capable of a read operation, the external electronic device may receive a data packet including data included in the characteristic information from the electronic device.

The external electronic device may select a service to be used based on the service list information and obtain connection information for using the selected service instead of performing data packet transmission and/or reception operations as described above. The external electronic device may perform an operation for establishing a connection for service use based on the obtained connection information. For example, connection for service use may be performed in the logical link control and adaptation protocol (L2CAP) layer of the BLE protocol stack.

In the L2CAP layer, protocol/service information may be used for connection between electronic devices. The protocol/service information may be, e.g., protocol service multiplexer (PSM) information. To obtain protocol/service information, the external electronic device may perform, e.g., a service search operation for the electronic device, an operation for selecting a service based on the service search operation, and/or an operation for requesting protocol/service information for using the selected service from the electronic device.

In the L2CAP layer, multiplexing of protocols and services may be supported. Accordingly, connections for a plurality of services based on various protocols may be present in the L2CAP layer. The PSM information may be used to identify the protocol on which connection between the electronic devices in the L2CAP layer is based. Further, PSM information may be used as a port number for distinguishing a plurality of connections based on the same protocol.

The above information is presented as background information only to assist with an understanding of the disclosure. No determination has been made, and no assertion is made, as to whether any of the above might be applicable as prior art with regard to the disclosure.

SUMMARY

For communication using the BLE scheme, e.g., an advertisement packet transmission and/or reception operation, a connection operation between electronic devices, and/or a service search operation is performed.

As another example, for communication using the BLE scheme, an advertisement packet transmission and/or reception operation, a connection operation between electronic devices, a service search operation, a protocol/service information request operation, and/or an operation for establishing a connection based on protocol/service information is performed.

Therefore, since a number of operations should be performed for communication between electronic devices using the BLE scheme, a lot of time is required and power of the electronic devices is consumed until communication starts.

Aspects of the disclosure are to address at least the above-mentioned problems and/or disadvantages and to provide at least the advantages described below. Accordingly, an aspect of the disclosure is to provide an electronic device transmitting and/or receiving protocol/service information and a method for operating the same.

Another aspect of the disclosure is to provide an electronic device and transmitting and/or receiving protocol/service information in a short-range communication network based on the BLE scheme and a method for operating the same.

Another aspect of the disclosure is to provide an electronic device transmitting and/or receiving encrypted protocol/service information in a short-range communication network based on the BLE scheme and a method for operating the same.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit and at least one processor. The at least one processor is configured to broadcast an advertisement packet including at least one first protocol/service information through the communication circuit, receive a connection request packet including at least one second protocol/service information from an external electronic device through the communication circuit, and transmit a connection response packet to the external electronic device when the at least one second protocol/service information is identical to the at least one first protocol/service information.

In accordance with another aspect of the disclosure, an electronic device is provided. The electronic device includes a communication circuit and at least one processor. The at least one processor is configured to receive an advertisement packet including at least one first protocol/service information from an external electronic device through the communication circuit, generate a connection request packet including at least one second protocol/service information identical to the at least one first protocol/service information included in the advertisement packet, transmit the connection request packet to the external electronic device through the communication circuit, and receive a connection response packet from the external electronic device through the communication circuit.

In accordance with another aspect of the disclosure, a method for transmitting protocol/service information by an electronic device is provided. The method includes broadcasting an advertisement packet including at least one first protocol/service information, receiving a connection request packet including at least one second protocol/service information from an external electronic device, and transmitting a connection response packet to the external electronic device when the at least one second protocol/service information is identical to the at least one first protocol/service information.

In accordance with another aspect of the disclosure, a method for receiving protocol/service information by an electronic device is provided. The method includes receiving an advertisement packet including at least one first protocol/service information from an external electronic device, generating a connection request packet including at least one second protocol/service information identical to the at least one first protocol/service information included in the advertisement packet, transmitting the connection request packet to the external electronic device, and receiving a connection response packet from the external electronic device.

The electronic device and operation method for transmitting and/or receiving protocol/service information according to various embodiments of the disclosure is to transmit and/or receive protocol/service information through an advertisement packet, enabling connection between electronic devices without a service search operation. Thus, it is possible to simplify the procedure for connection between electronic devices and save time and/or resources according to the simplified procedure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
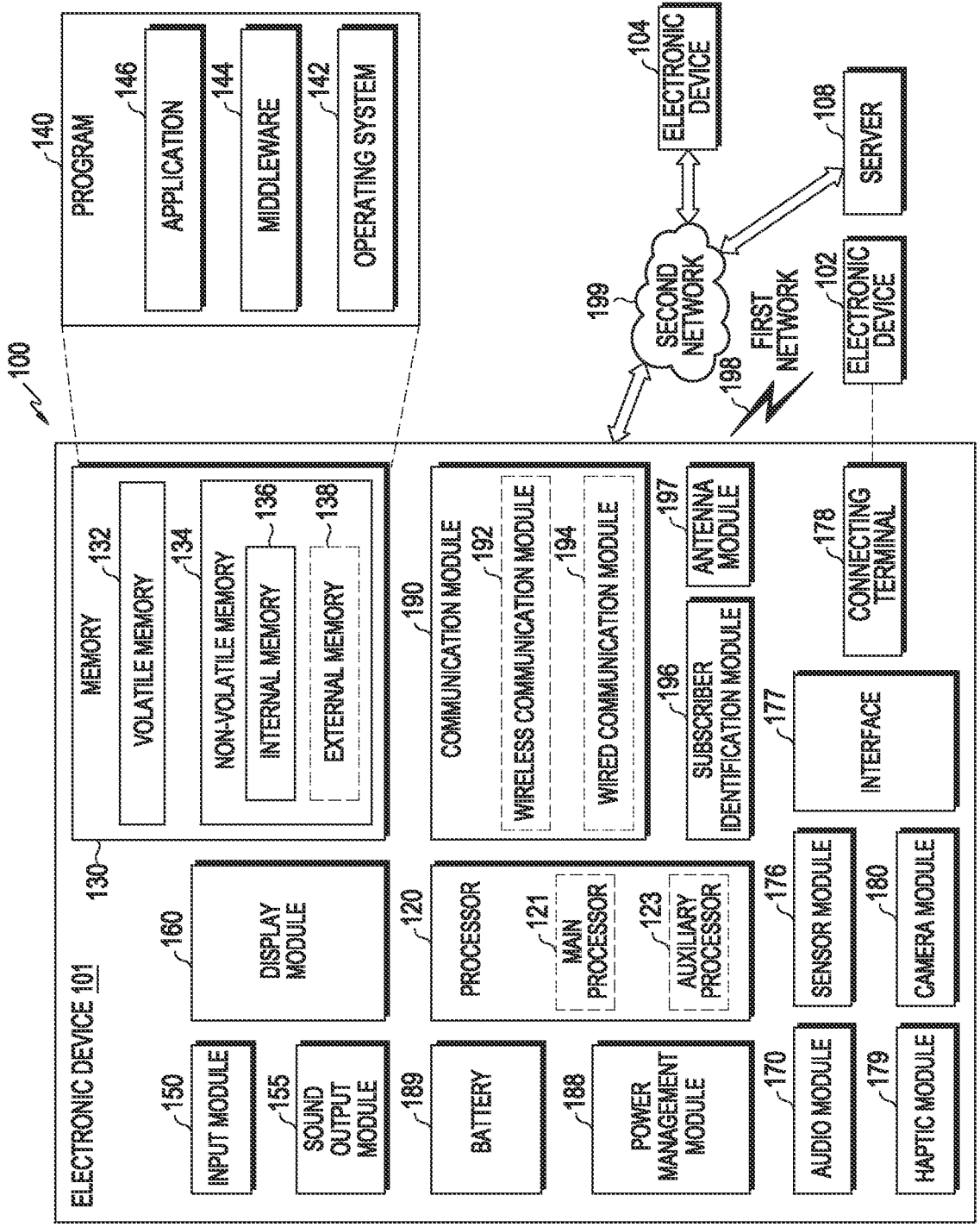
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment of the disclosure, the display 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a $5^{th}$ generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductor or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of devices. The electronic devices may include, for example, a portable communication device (e.g., a smartphone), a computer device, a portable multimedia device, a portable medical device, a camera, a wearable device, or a home appliance. The electronic devices according to an embodiment are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

The description of embodiments of the disclosure focuses primarily on Bluetooth low energy specifications, but the subject matter of the disclosure may also be applicable to other communication systems with a similar technical background with minor changes without significantly departing from the scope of the disclosure, and this may be so performed by the determination of those skilled in the art to which the disclosure pertains.

Various embodiments of the disclosure may provide an electronic device transmitting and/or receiving protocol/service information and a method for operating the same.

According to various embodiments of the disclosure, the protocol/service information may be protocol service multiplexer (PSM) information. According to various embodiments of the disclosure, one or more pieces of protocol/service information may be included in an advertisement packet and/or a connection request packet.

According to various embodiments of the disclosure, the protocol/service information may be used to establish a channel (e.g., a connection-oriented channel (CoC)) in the logical link control and adaptation protocol (L2CAP) layer of the BLE protocol stack. According to various embodiments of the disclosure, when receiving an advertisement packet including protocol/service information from an external electronic device, the electronic device may transmit a connection request packet for establishing a channel in the L2CAP layer to the external electronic device.

Hereinafter, protocol/service information that may be obtained by performing a service search operation according to various embodiments is referred to as "SD_PSM", and protocol/service information that may be included in the advertisement packet is referred to as "ADV_PSM".

Figure 2:
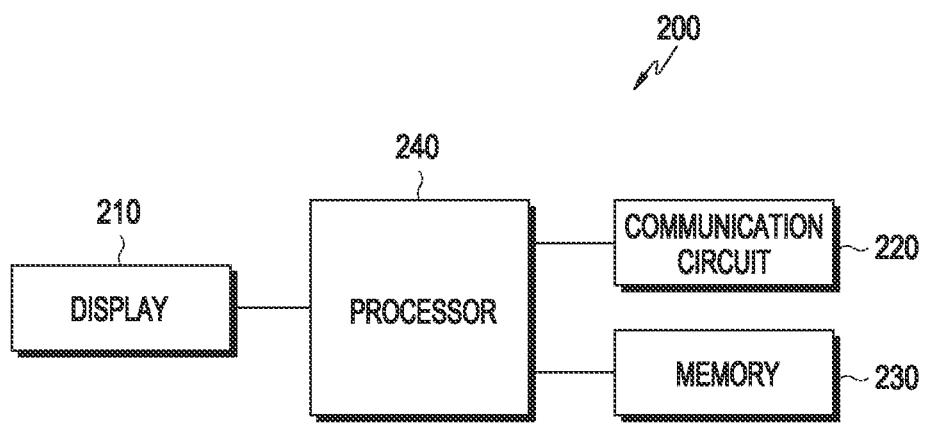
FIG. 2 is a block diagram illustrating an electronic device according to an embodiment of the disclosure.

FIG. 2 is a block diagram 200 illustrating an electronic device according to an embodiment of the disclosure.

Referring to FIG. 2, in an embodiment of the disclosure, an electronic device 101 may include a display 210, a communication circuit 220, a memory 230, and a processor 240.

In an embodiment of the disclosure, under the control of the processor 240, the display 210 may visually display an operation of connecting and communicating with at least one external electronic device (e.g., the external electronic device 102) based on information generated by the processor 240, information transmitted and/or received through the communication circuit 220, or a configured communication scheme (e.g., BLE scheme). In an embodiment of the disclosure, the display 210 may be included in the display module 160 of FIG. 1.

In an embodiment of the disclosure, the communication circuit 220 may communicate with an external electronic device based on the BLE scheme. In an embodiment of the disclosure, the communication circuit 220 may perform at least one of an advertisement packet broadcast operation, a scan operation for receiving an advertisement packet broadcast by an external electronic device, an asynchronous connectionless (ACL) connection operation, a service search request packet transmission and/or reception operation, a service search response packet transmission and/or reception operation, a connection request packet transmission and/or reception operation for establishing a channel, or a data packet transmission and/or reception operation under the control of the processor 240.

In an embodiment of the disclosure, the communication circuit 220 may be included in the communication module 190 of FIG. 1.

In an embodiment of the disclosure, the memory 230 may store the information transmitted and/or received by the communication circuit 220 and the information generated by the processor 240. According to an embodiment of the disclosure, the memory 230 may store information about an application used to provide or receive a service, information about at least one ADV_PSM allocated to at least one service, information for connection with an external electronic device or channel establishment, a command, and/or an indicator.

In an embodiment of the disclosure, the memory 230 may include a volatile memory or a non-volatile memory, and may be included in the memory 130 of FIG. 1.

In an embodiment of the disclosure, the processor 240 may perform the following operations for providing at least one service.

In an embodiment of the disclosure, the processor 240 may monitor the occurrence of a trigger event for determining whether to generate an advertisement packet. In an embodiment of the disclosure, the processor 240 may monitor whether a trigger event occurs within a set time from the start of the monitoring operation. The trigger event may include, e.g., at least one of the following events. However, the trigger event may not be limited thereto.

Execute a specific application (e.g., at least one of Internet, contact, or note application) in the electronic device 101

Change the screen power state (on/off) of the electronic device 101

Change the Wi-Fi connection state (on/off/connected) of the electronic device 101

Clipboard copy of electronic device 101

Change the call state (e.g., idle state/ringing state/busy state) of the electronic device 101

Change the operation state of the external electronic device (e.g., change the wearing state when the external electronic device is a wearable device, or change the network connection state of the external electronic device)

In an embodiment of the disclosure, when a trigger event occurs, the processor 240 may allocate at least one ADV_PSM to at least one service related to the generated trigger event and generate an advertisement packet including the allocated at least one ADV_PSM. The processor 240 may control the communication circuit 220 to broadcast the generated advertisement packet.

In an embodiment of the disclosure, at least one ADV_PSM may be used to establish a connection for using at least one service provided by the electronic device 101. Accordingly, the processor 240 may broadcast the advertisement packet through the communication circuit 220 and wait for reception of the connection request packet.

In an embodiment of the disclosure, the processor 240 may identify that the connection request packet has been received through the communication circuit 220. In an embodiment of the disclosure, the connection request packet may be received from an external electronic device (e.g., the external electronic device 102) that performs a scan operation to receive the advertisement packet.

In an embodiment of the disclosure, the processor 240 may identify whether at least one ADV_PSM is included in the received connection request packet. In an embodiment of the disclosure, when the received connection request packet includes at least one ADV_PSM, the processor 240 may identify whether the at least one ADV_PSM included in the received connection request packet is the same as the at least one ADV_PSM included in the advertisement packet.

In an embodiment of the disclosure, when the at least one ADV_PSM included in the received connection request packet is not the same as the at least one ADV_PSM included in the advertisement packet, the processor 240 may determine the received connection request packet as an inappropriate connection request packet and discard the connection request packet. As another example, the processor 240 may transmit information about at least one ADV_PSM included in the advertisement packet to the communication circuit 220 to instruct the communication circuit 220 to discard an inappropriate connection request packet without transmitting the inappropriate connection request packet to the processor 240.

In an embodiment of the disclosure, when the at least one ADV_PSM included in the received connection request packet is the same as the at least one ADV_PSM included in the advertisement packet, the processor 240 may transmit the connection response packet to the external electronic device through the communication circuit 220. In an embodiment of the disclosure, the connection response packet may include information indicating that the connection request of the external electronic device is accepted.

In the embodiment of the disclosure, the processor 240 may establish at least one channel for communicating with the external electronic device. For example, the processor 240 may allocate at least one channel for communicating with the external electronic device, and may transmit information about the allocated at least one channel to the external electronic device through the communication circuit 220. The processor 240 may transmit and/or receive at least one data packet related to the external electronic device and at least one service on the allocated at least one channel through the communication circuit 220.

In an embodiment of the disclosure, when at least one ADV_PSM is not included in the received connection request packet, the processor 240 may identify whether the received connection request packet is an ACL connection request packet received on the established channel. In an embodiment of the disclosure, the established channel may be a channel having a channel identifier (CID) of 0X0004, and may be different from a channel (e.g., a channel having a CID of 0X0005) through which the connection request packet including at least one ADV_PSM may be received.

In an embodiment of the disclosure, when the received connection request packet is identified as the ACL connection request packet received on the established channel, the processor 240 may transmit the ACL connection response packet to the external electronic device.

In an embodiment of the disclosure, the service search request packet may be received from the external electronic device through the communication circuit 220. The service search request packet may include information for requesting to provide information about one or more services provided by the electronic device 101. The processor 240 may transmit the service search response packet to the external electronic device through the communication circuit 220 in response to the service search request packet. In an embodiment of the disclosure, the service search response packet may include service list information.

In an embodiment of the disclosure, the processor 240 may control the communication circuit 220 to transmit and/or receive a data packet related to a service selected by the external electronic device to and/or from the external electronic device through the ACL connection.

In another example, the processor 240 may receive a data packet requesting SD_PSM from the external electronic device through the communication circuit 220 through the ACL connection. SD_PSM may be, e.g., allocated to a service of the electronic device 101 selected by the external electronic device. The processor 240 may transmit the data packet including SD_PSM to the external electronic device through the communication circuit 220 and may control the communication circuit 220 to transmit and/or receive the data packet related to the service selected by the external electronic device to and/or from the external electronic device.

In an embodiment of the disclosure, the processor 240 may perform the following operations for receiving at least one service.

In an embodiment of the disclosure, the processor 240 may perform a scan operation to monitor whether an advertisement packet broadcast by an external electronic device (e.g., the external electronic device 102) is received. In an embodiment of the disclosure, the scan operation may be performed for a set time.

In an embodiment of the disclosure, when the broadcast advertisement packet is received within the set time, the processor 240 may identify whether at least one ADV_PSM is included in the received advertisement packet.

In an embodiment of the disclosure, when it is identified that at least one ADV_PSM is included in the received advertisement packet, the processor 240 may generate a connection request packet including at least one ADV_PSM. The processor 240 may transmit the generated connection request packet to the external electronic device which broadcasts the advertisement packet through the communication circuit 220.

In an embodiment of the disclosure, the processor 240 may transmit the generated connection request packet to the external electronic device through the communication circuit 220, based on information about the external electronic device included in the advertisement packet (e.g., at least one of the media access control (MAC) address of the external electronic device, the product identifier (ID) of the external electronic device, or the name of the external electronic device).

In an embodiment of the disclosure, when it is identified that at least one ADV_PSM is included in the advertisement packet, the processor 240 may determine whether to use the at least one service provided by the external electronic device based on the information about the at least one service included in the advertisement packet. When the processor 240 determines to use at least one service provided by the external electronic device, the processor 240 may transmit a connection request packet including at least one ADV_PSM to the external electronic device through the communication circuit 220.

In an embodiment of the disclosure, the processor 240 may receive a connection response packet from an external electronic device through the communication circuit 220. In an embodiment of the disclosure, when the received connection response packet includes information indicating that the connection request is accepted, the processor 240 may determine that the connection with the external electronic device is successful.

In an embodiment of the disclosure, the processor 240 may establish at least one channel for communication with the external electronic device. For example, when information about at least one channel allocated by the external electronic device is received through the communication circuit 220, the processor 240 may establish at least one channel for communication with the external electronic device based on the received information.

In an embodiment of the disclosure, the processor 240 may control the communication circuit 220 to perform data packet transmission and/or reception operations with the external electronic device on at least one channel.

As another example, if it is identified that at least one ADV_PSM is not included in the received advertisement packet, the processor 240 may receive a service through an ACL connection operation or a connection operation for configuring a CoC.

In an embodiment of the disclosure, the processor 204 may perform the following operations as the ACL connection operation.

In an embodiment of the disclosure, the processor 240 may transmit the ACL connection request packet to the external electronic device through the communication circuit 220. For example, the ACL connection request packet may be transmitted on the established channel, and the established channel may be a channel having the CID of 0X0004.

In an embodiment of the disclosure, the processor 240 may identify whether the ACL connection response packet is received from the external electronic device through the communication circuit 220. In an embodiment of the disclosure, when the ACL connection response packet is not received within a set time, the processor 240 may perform a scan operation to monitor again whether an advertisement packet is received.

In an embodiment of the disclosure, when the ACL connection response packet is received within a set time, the processor 240 may transmit the service search request packet to the external electronic device through the communication circuit 220. The processor 240 may identify whether the service search response packet is received from the external electronic device through the communication circuit 220. In an embodiment of the disclosure, when the service search response packet is not received within the set time, the processor 240 may perform a scan operation to monitor again whether the advertisement packet is received.

In an embodiment of the disclosure, when a service search response packet is received within a set time, the processor 240 may transmit and/or receive a data packet to and/or from an external electronic device through the communication circuit 220. In an embodiment of the disclosure, the service search response packet may include service list information.

In an embodiment of the disclosure, the service list information may include information about one or more services provided by the electronic device 101. The information about the one or more services may include information about whether at least one of a read operation or a write operation may be performed on data related to the service. The processor 240 may transmit and/or receive a data packet to and/or from an external electronic device through the communication circuit 220 based on information about one or more services.

For example, when it is detected that the processor 240 may perform the read operation based on the information about the one or more services, the processor 240 may receive a data packet including data related to the service from the external electronic device through the communication circuit 220.

As another example, when it is detected that the processor 240 may perform the write operation based on the information about the one or more services, the processor 240 may transmit a data packet including data related to the service to the external electronic device through the communication circuit 220.

In an embodiment of the disclosure, the processor 204 may perform the following operations as a connection operation for CoC configuration.

In an embodiment of the disclosure, the processor 240 may transmit the ACL connection request packet to the external electronic device through the communication circuit 220. For example, the ACL connection request packet may be transmitted on the established channel, and the established channel may be a channel having the CID of 0X0004.

In an embodiment of the disclosure, the processor 240 may identify whether the ACL connection response packet is received from the external electronic device through the communication circuit 220. In an embodiment of the disclosure, when the ACL connection response packet is not received within a set time, the processor 240 may perform a scan operation to monitor again whether an advertisement packet is received.

In an embodiment of the disclosure, when the ACL connection response packet is received within a set time, the processor 240 may transmit the service search request packet to the external electronic device through the communication circuit 220. The processor 240 may identify whether the service search response packet is received from the external electronic device through the communication circuit 220. In an embodiment of the disclosure, when the service search response packet is not received within the set time, the processor 240 may perform a scan operation to monitor again whether the advertisement packet is received.

In an embodiment of the disclosure, when a service search response packet is received within a set time, the processor 240 may transmit and/or receive a data packet to and/or from an external electronic device through the communication circuit 220. In an embodiment of the disclosure, the service search response packet may include service list information, and the processor 240 may select a service to be used based on the service list information.

In an embodiment of the disclosure, the processor 240 may transmit a data packet requesting SD_PSM for the selected service to the external electronic device through the communication circuit 220, and may receive the data packet including the requested SD_PSM from the external electronic device through the communication circuit 220.

In an embodiment of the disclosure, the processor 240 may transmit a connection request packet including SD_PSM to the external electronic device through the communication circuit 220. The connection request packet including SD_PSM may be, e.g., a connection request for establishing a channel, and the channel to be established may indicate a channel for performing a data packet transmission and/or reception operation related to a service.

In an embodiment of the disclosure, the processor 240 may identify whether the connection response packet is received within the set time. In an embodiment of the disclosure, when the connection response packet is not received within the set time, the processor 240 may perform a scan operation to monitor again whether the advertisement packet is received.

In an embodiment of the disclosure, when the connection response packet is received within the set time and information indicating that the connection request is accepted is included in the received connection response packet, the processor 240 may determine that the connection with the external electronic device is successful.

In an embodiment of the disclosure, the processor 240 may establish at least one communication channel with the external electronic device. For example, when information about at least one communication channel allocated by the external electronic device is received, the processor 240 may establish at least one communication channel based on the received information.

In an embodiment of the disclosure, the processor 240 may transmit and/or receive at least one data packet related to the service with the external electronic device through at least one configured communication channel.

According to various embodiments of the disclosure, the processor 240 may perform operations related to the electronic device 101 to be described below.

Figure 3A:
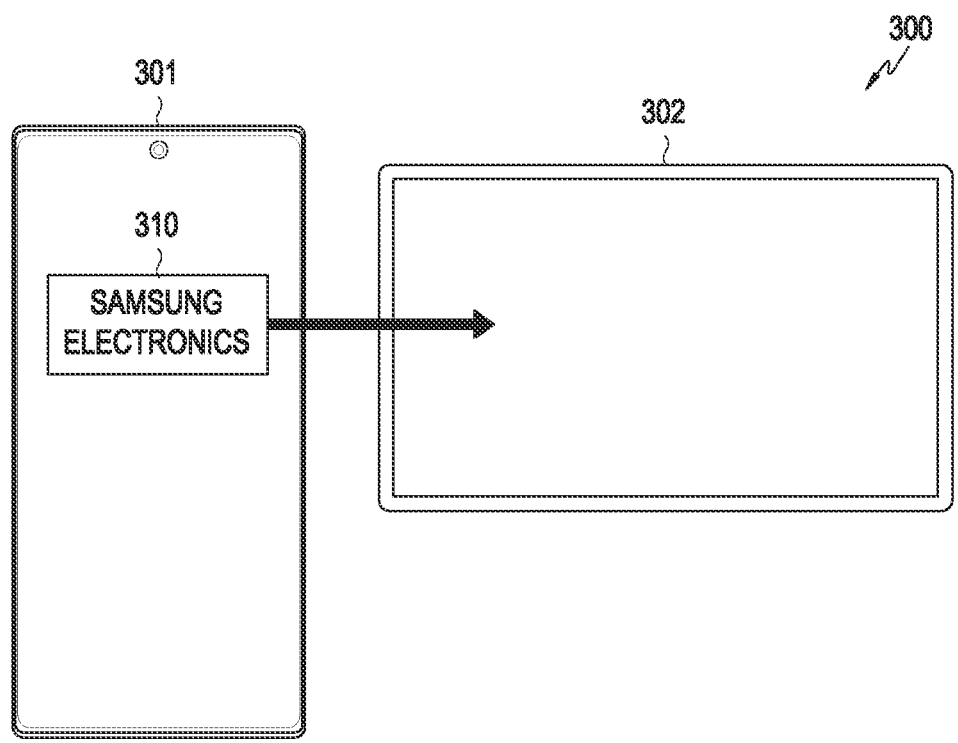
FIGS. 3A and 3B illustrate a service related to a trigger event according to an embodiment of the disclosure.
Figure 3B:
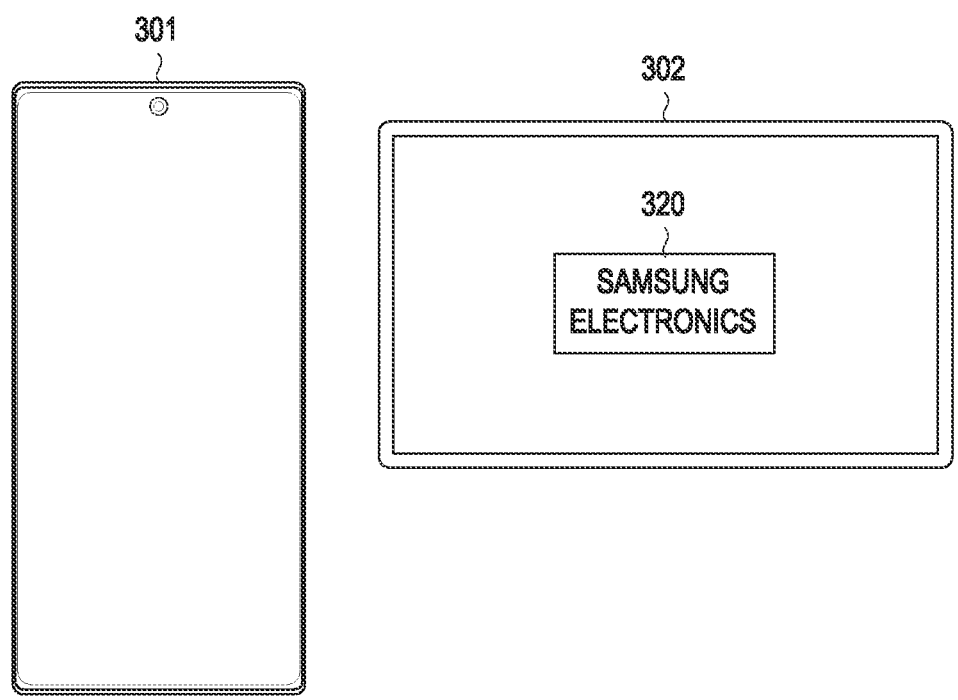

FIGS. 3A and 3B include a view 300 illustrating a service related to a trigger event according to an embodiment of the disclosure.

Referring to FIGS. 3A and 3B, a first electronic device 301 may be an electronic device providing a service, and a second electronic device 302 may be an electronic device receiving the service. The first electronic device 301 and/or the second electronic device 302 may be, e.g., substantially the same as the electronic device 101 of FIG. 1 or the electronic device 200 of FIG. 2.

In an embodiment of the disclosure, when a trigger event occurs, the first electronic device 301 may identify a service related to the trigger event. For example, the first electronic device 301 may detect that the "clipboard copy" event as shown in FIG. 3A has occurred, and may identify a service related to the "clipboard copy" event.

In an embodiment of the disclosure, the "clipboard copy" event may indicate an event in which text (e.g., "SAMSUNG ELECTONICS") 320 displayed on the display 210 of the first electronic device 301 is stored in a temporary storage space of the memory 230.

In an embodiment of the disclosure, the first electronic device 301 may allocate ADV_PSM to the identified service and may broadcast an advertisement packet including the allocated ADV_PSM.

In an embodiment of the disclosure, the second electronic device 302 may receive the broadcast advertisement packet and may transmit a connection request packet including ADV_PSM to the first electronic device 301.

In an embodiment of the disclosure, the first electronic device 301 may receive the connection request packet and may determine whether the connection request packet includes the same ADV_PSM as the ADV_PSM included in the advertisement packet. When it is identified that the connection request packet includes the same ADV_PSM as the ADV_PSM included in the advertisement packet, the first electronic device 301 may transmit, to the second electronic device 302, a connection response packet including information indicating that the connection request of the second electronic device 302 is accepted.

In an embodiment of the disclosure, the first electronic device 301 may allocate at least one channel for data packet transmission and/or reception with the second electronic device 302, and may transmit information about the allocated at least one channel to the second electronic device 302. In an embodiment of the disclosure, a data packet for a service related to the "clipboard copy" event may be transmitted and/or received on at least one allocated channel. For example, the data packet transmitted from the first electronic device 301 to the second electronic device 302 may include information stored in the temporary storage space of the memory 230 of the first electronic device 301.

In an embodiment of the disclosure, the second electronic device 302 may receive a data packet from the first electronic device 301 and may display information included in the received data packet on the screen of the second electronic device 302 as illustrated in FIG. 3B. Based on these operations, e.g., the same information 320 as the information 310 displayed on the screen of the first electronic device 301 may be displayed on the screen of the second electronic device 302.

FIGS. 3A and 3B illustrate a service related to a "clipboard copy" event as a service related to a trigger event, but the disclosure is not limited thereto, and the following services may be used.

For example, when a trigger event in which a specific application is executed occurs in the first electronic device 301, the first electronic device 301 may allocate ADV_PSM to a service (e.g., a recently executed application information providing service) related to the trigger event. The first electronic device 301 may broadcast an advertisement packet including the allocated ADV_PSM.

In an embodiment of the disclosure, when the first electronic device 301 receives a connection request packet including the same ADV_PSM as the ADV_PSM included in the advertisement packet from the second electronic device 302, the first electronic device 301 may transmit a connection response packet including information indicating acceptance of the connection request to the second electronic device 302.

In an embodiment of the disclosure, the first electronic device 301 may allocate at least one channel for data packet transmission and/or reception with the second electronic device 302, and may transmit information about the allocated at least one channel to the second electronic device 302. In an embodiment of the disclosure, a data packet including information about an application executed on the first electronic device 301 may be transmitted and/or received on the allocated at least one channel. In an embodiment of the disclosure, the second electronic device 302 may add and display to the recently executed application history information about the second electronic device 302 based on the information about the application executed on the first electronic device 301.

As another example, when a trigger event in which the first electronic device 301 is connected to the Wi-Fi network occurs, the first electronic device 301 may allocate ADV_PSM to a service related to the trigger event (e.g., an access point (AP) connection service). The first electronic device 301 may broadcast an advertisement packet including the allocated ADV_PSM.

In an embodiment of the disclosure, when the first electronic device 301 receives a connection request packet including the same ADV_PSM as the ADV_PSM included in the advertisement packet from the second electronic device 302, the first electronic device 301 may transmit a connection response packet including information indicating acceptance of the connection request to the second electronic device 302.

In an embodiment of the disclosure, the first electronic device 301 may allocate at least one channel for data packet transmission and/or reception with the second electronic device 302, and may transmit information about the allocated at least one channel to the second electronic device 302. In an embodiment of the disclosure, a data packet including Wi-Fi network connection information about the first electronic device 301 may be transmitted and/or received on the allocated at least one channel. In an embodiment of the disclosure, the second electronic device 302 may connect to the same AP as the AP to which the first electronic device 301 is connected, based on Wi-Fi network connection information about the first electronic device 301.

According to various embodiments of the disclosure, an electronic device 101 may comprise a communication circuit 220 and at least one processor (e.g., the processor 240 of FIG. 2). The at least one processor may be configured to broadcast an advertisement packet including at least one first protocol/service information (e.g., at least one ADV_PSM) through the communication circuit 220, receive a connection request packet including at least one second protocol/service information from an external electronic device 102 through the communication circuit 220, and transmit a connection response packet to the external electronic device 102 when the at least one second protocol/service information is identical to the at least one first protocol/service information.

In an embodiment of the disclosure, the at least one processor may be configured to allocate at least one channel for transmitting and/or receiving at least one data packet to/from the external electronic device 102, transmit information about the allocated at least one channel to the external electronic device through the communication circuit 220, and transmit and/or receive the at least one data packet to/from the external electronic device 102 on the allocated channel.

In an embodiment of the disclosure, the advertisement packet may include a type field and a data field. The type field may include information indicating that data included in the data field is data configured by the electronic device, and the data field may include the at least one first protocol/service information and product identifier (ID) information about the electronic device.

In an embodiment of the disclosure, the data field may further include at least one of name information about the electronic device, user information about the electronic device, or user account information about the electronic device.

In an embodiment of the disclosure, the advertisement packet may include a type field and a data field. The type field may include information indicating that data included in the data field is data configured by the electronic device, and the data field may include the first protocol/service information and service identifier (ID) information about the electronic device.

In an embodiment of the disclosure, the data field may further include at least one of user account information about the electronic device, service type information, service name information, service provider information, or service description information.

In an embodiment of the disclosure, the at least one processor may be configured to generate encryption information based on user account information and a configured security algorithm, encrypt the first protocol/service information based on the generated encryption information, generate the advertisement packet including the user account information and the encrypted first protocol/service information, and broadcast the generated advertisement packet through the communication circuit 220.

According to an embodiment of the disclosure, an electronic device 101 may comprise a communication circuit 220 and at least one processor (e.g., the processor 240 of FIG. 2). The at least one processor may be configured to receive an advertisement packet including at least one first protocol/service information (e.g., at least one ADV_PSM) from an external electronic device 102 through the communication circuit, generate a connection request packet including at least one second protocol/service information identical to the at least one first protocol/service information included in the advertisement packet, transmit the connection request packet to the external electronic device through the communication circuit 220, and receive a connection response packet from the external electronic device 102 through the communication circuit 220.

In an embodiment of the disclosure, the at least one processor may be configured to receive information about at least one channel allocated by the external electronic device 102 through the communication circuit 220, establish the received at least one channel as at least one channel for communication with the external electronic device 102, and transmit and/or receive at least one data packet to/from the external electronic device 102 on the established at least one channel through the communication circuit.

In an embodiment of the disclosure, the advertisement packet may include a type field and a data field. The type field may include information indicating that data included in the data field is data configured by the external electronic device 102. The data field may include the at least one first protocol/service information and product identifier (ID) information about the external electronic device 102.

In an embodiment of the disclosure, the data field may further include at least one of name information about the external electronic device 102, user information about the external electronic device 102, or user account information about the external electronic device 102.

In an embodiment of the disclosure, the advertisement packet may include a type field and a data field. The type field may include information indicating that data included in the data field is data configured by the external electronic device 102, and the data field may include the at least one first protocol/service information and service identifier (ID) information about the external electronic device 102.

In an embodiment of the disclosure, the data field may further include at least one of user account information about the electronic device, service type information, service name information, service provider information, or service description information.

In an embodiment of the disclosure, the at least one processor may be configured to, when the at least one first protocol service information is encrypted, generate decryption information based on a preset security algorithm and the user account information included in the advertisement packet and decrypt the encrypted at least one first protocol service information based on the generated decryption information.

Figure 4A:
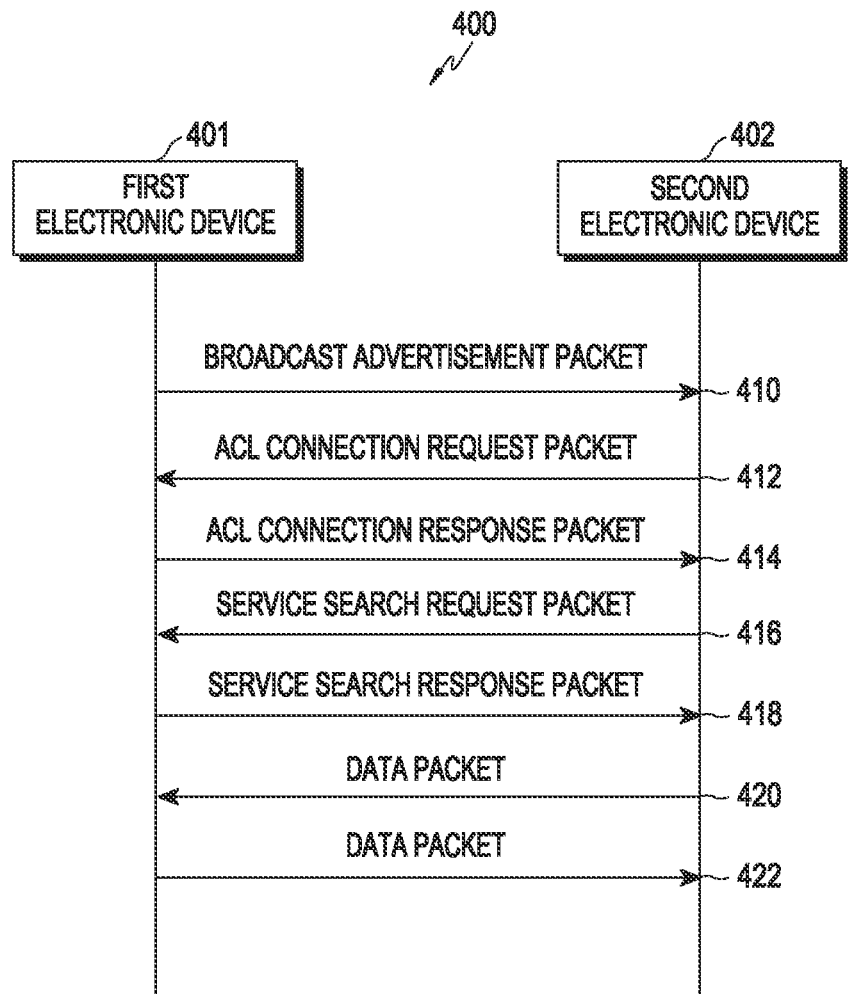
FIG. 4A is a signal flowchart schematically illustrating an operation of connecting electronic devices in a BLE network according to an embodiment of the disclosure.

FIG. 4A is a signal flowchart 400 schematically illustrating an operation of connecting electronic devices in a BLE network according to an embodiment of the disclosure.

In FIG. 4A, a first electronic device 401 may be an electronic device providing a service, and a second electronic device 402 may be an electronic device receiving a service. The first electronic device 401 and/or the second electronic device 402 may be, e.g., substantially the same electronic device as the electronic device 101 of FIG. 1, respectively.

Referring to FIG. 4A, in operation 410, the first electronic device 401 may broadcast an advertisement packet. The advertisement packet may include address information about the first electronic device 401. The advertisement packet may be periodically broadcast according to a set period.

In an embodiment of the disclosure, the broadcast advertisement packet may be received by the second electronic device 402. When the second electronic device 402 receives the advertisement packet, in operation 412, the second electronic device 402 may transmit, to the first electronic device 401, the ACL connection request packet for requesting the ACL connection, based on the address of the first electronic device 401 included in the advertisement packet. The ACL connection may be, e.g., a connection for transmitting and/or receiving a data packet between the first electronic device 401 and the second electronic device 402.

The first electronic device 401 may receive the ACL connection request packet and may determine whether to accept the ACL connection request of the second electronic device 402. In operation 414, the first electronic device 401 may transmit an ACL connection response packet including whether to accept the ACL connection request to the second electronic device 402.

In an embodiment of the disclosure, when the ACL connection response packet includes information indicating that the ACL connection request is accepted, the second electronic device 402 may identify that the connection with the first electronic device 401 is successful.

When it is identified that the connection with the first electronic device 401 is successful, in operation 416, the second electronic device 402 may transmit, to the first electronic device 401, a service search request packet for searching for at least one service provided by the first electronic device 401. In operation 418, the first electronic device 401 may transmit a service search response packet including service list information to the second electronic device 402 in response to the service search request packet.

In an embodiment of the disclosure, the service search operation as shown in operation 416 and/or operation 418 may be a service search operation based on a generic attribute profile (GATT). The GATT-based service search operation may include an operation for obtaining information included in profile information about the first electronic device 401.

In an embodiment of the disclosure, the profile information about the first electronic device 401 may include one or more service elements, and the one or more service elements may include one or more characteristic elements. The one or more service elements may include information (e.g., a blood pressure change detection service) about one or more services provided by the first electronic device 401, and the one or more characteristic elements may include data (e.g., a blood pressure measurement value) related to the corresponding service.

In an embodiment of the disclosure, one or more characteristic elements may have property values. The property value may indicate, e.g., at least one of a read operation or a write operation. The second electronic device 402 may transmit a data packet to the first electronic device 401 or may receive a data packet from the first electronic device 401, based on a property value for at least one characteristic element among one or more characteristic elements.

For example, when the property value for the at least one characteristic element indicates the write operation, the second electronic device 402 may transmit a data packet including data to be included in the at least one characteristic element to the first electronic device 401 in operation 420.

As another example, when the property value for the at least one characteristic element indicates a read operation, in operation 422, the second electronic device 402 may receive a data packet including data included in the at least one characteristic element from the first electronic device 401.

In an embodiment of the disclosure, the channel through which operations 412 to 422 are performed may be a channel through which an attribute (ATT) protocol is used, or may be a channel having a configured CID (e.g., "0X0004").

Figure 4B:
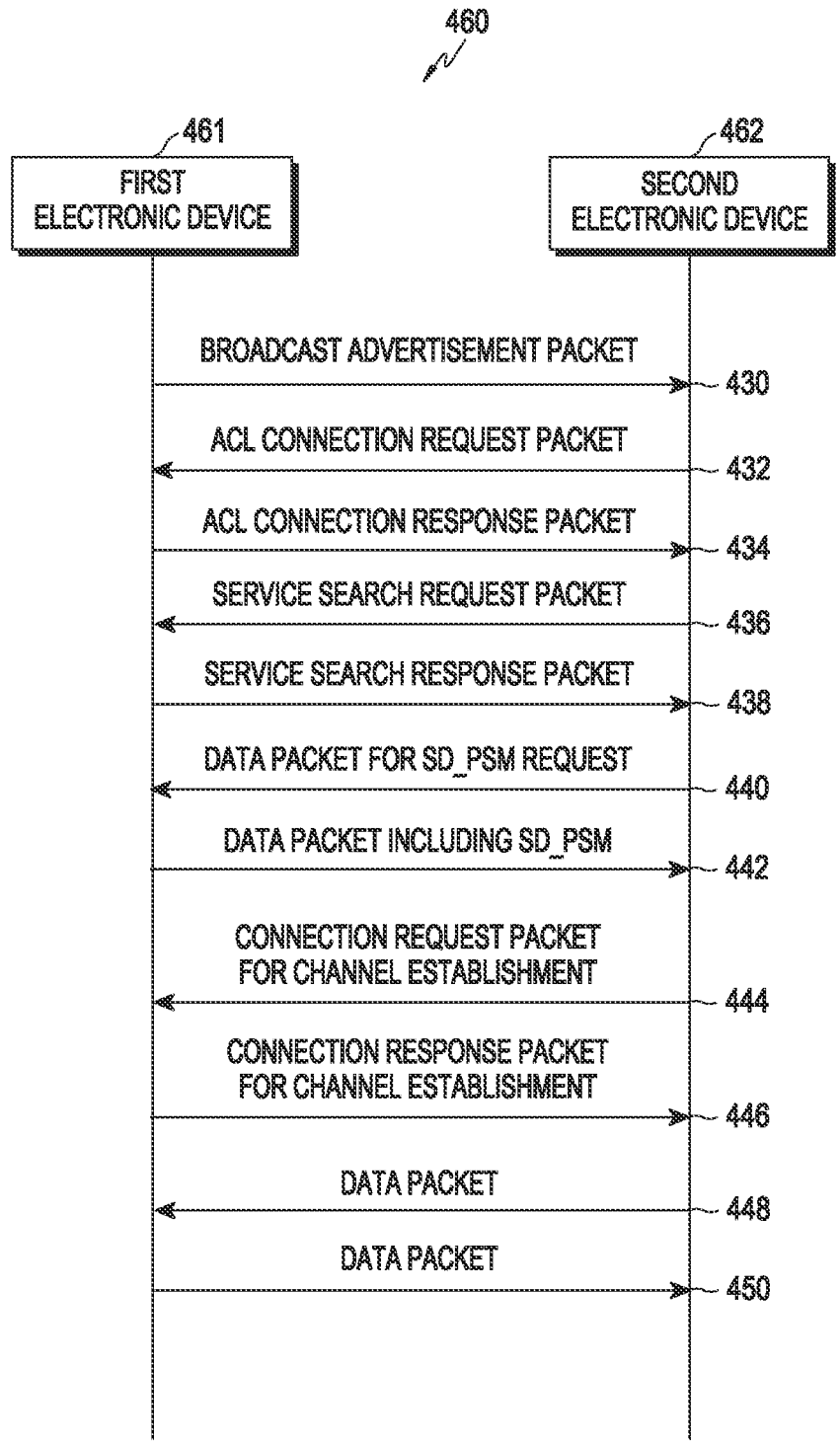
FIG. 4B is a signal flowchart schematically illustrating an operation of connecting electronic devices in a BLE network according to an embodiment of the disclosure.

According to an embodiment of the disclosure, connection operations for channel establishment may be performed as shown in FIG. 4B in a state where an ACL connection is established between electronic devices so that more data related to a service may be transmitted and/or received between electronic devices.

FIG. 4B is a signal flowchart 460 schematically illustrating an operation of connecting electronic devices in a BLE network according to an embodiment of the disclosure.

In FIG. 4B, a first electronic device 461 may be an electronic device providing a service, and a second electronic device 462 may be an electronic device receiving a service. The first electronic device 461 and/or the second electronic device 462 may be, e.g., substantially the same electronic device as the electronic device 101 of FIG. 1, respectively.

Referring to FIG. 4B, in operation 430, the first electronic device 461 may broadcast an advertisement packet. The advertisement packet may include address information about the first electronic device 461. The advertisement packet may be periodically broadcast according to a set period.

In an embodiment of the disclosure, the broadcast advertisement packet may be received by the second electronic device 462. When the second electronic device 462 receives the advertisement packet, in operation 432, the second electronic device 402 may transmit, to the first electronic device 461, the ACL connection request packet for requesting the ACL connection, based on the address information about the first electronic device 461 included in the advertisement packet. The ACL connection may be, e.g., a connection for transmitting and/or receiving a data packet between the first electronic device 461 and the second electronic device 462.

The first electronic device 461 may receive the ACL connection request packet and may determine whether to accept the ACL connection request of the second electronic device 462. In operation 434, the first electronic device 461 may transmit an ACL connection response packet including whether to accept the ACL connection request to the second electronic device 462.

In an embodiment of the disclosure, when the ACL connection response packet includes information indicating that the ACL connection request is accepted, the second electronic device 462 may identify that the connection with the first electronic device 461 is successful.

When it is identified that the connection with the first electronic device 461 is successful, in operation 436, the second electronic device 462 may transmit, to the first electronic device 461, a service search request packet for searching for at least one service provided by the first electronic device 461. In operation 438, the first electronic device 461 may transmit a service search response packet including service list information to the second electronic device 462 in response to the service search request packet. In an embodiment of the disclosure, the service search operation as shown in operation 436 and/or operation 438 may be a service search operation based on a GATT.

In an embodiment of the disclosure, the second electronic device 462 may select a service to be used based on the service list information. In operation 440, the second electronic device 462 may transmit, to the first electronic device 461, a data packet for requesting to provide the SD_PSM allocated to the selected service. In operation 442, the first electronic device 461 may transmit a data packet including SD_PSM to the second electronic device 462 in response to the data packet.

In an embodiment of the disclosure, the second electronic device 462 may perform an operation for establishing a channel for using a service in the state of being ACL connected to the first electronic device 461. For example, in operation 444, the second electronic device 462 may transmit a connection request packet for channel establishment to the first electronic device 461. The connection request packet transmitted to the first electronic device 461 may include SD_PSM obtained in operation 442.

In an embodiment of the disclosure, when the connection request packet for channel establishment is received, the first electronic device 461 may detect whether the SD_PSM included in the connection request packet for channel establishment is the same as the SD_PSM allocated to the service of the first electronic device 461. When the SD_PSM included in the connection request packet for channel establishment is the same as the SD_PSM allocated to the service of the first electronic device 461, the first electronic device 461 may transmit the connection response packet for channel establishment to the second electronic device 462 in operation 446. The connection response packet for channel establishment may include, e.g., information indicating that the connection of the second electronic device 462 is accepted.

In an embodiment of the disclosure, the first electronic device 461 may allocate at least one channel for performing a data packet transmission and/or reception operation with the second electronic device 462, and may transmit information about the allocated at least one channel to the second electronic device 625.

In an embodiment of the disclosure, when the second electronic device 462 receives the connection response packet including information indicating that the connection is accepted, the second electronic device 462 may detect that the connection with the first electronic device 461 is successful and may receive information about the channel allocated by the first electronic device 461.

In operation 448, the second electronic device 462 may transmit a data packet including service-related data to the first electronic device 461 on at least one channel indicated by the received information. In operation 450, the second electronic device 462 may receive the data packet including service-related data from the first electronic device 461 on at least one channel indicated by the received information. In an embodiment of the disclosure, the operation order of operations 448 and 450 may be changed. In an embodiment of the disclosure, each of operations 448 and 450 may be performed one or more times, and one of operations 448 and 450 may be omitted.

In an embodiment of the disclosure, the channel through which operations 432 to 442 are performed may be a channel through which an ATT protocol is used, or may be a channel having a configured CID (e.g., "0X0004"). In an embodiment of the disclosure, the channel on which operations 444 and 446 are performed may be a signaling channel of an L2CAP layer, or may be a channel having a configured CID (e.g., "0X0005"). In an embodiment of the disclosure, the at least one channel on which operations 448 and 450 are performed may be at least one channel having a configured CID (e.g., at least one of "0x0040-0xFFFF").

Figure 5:
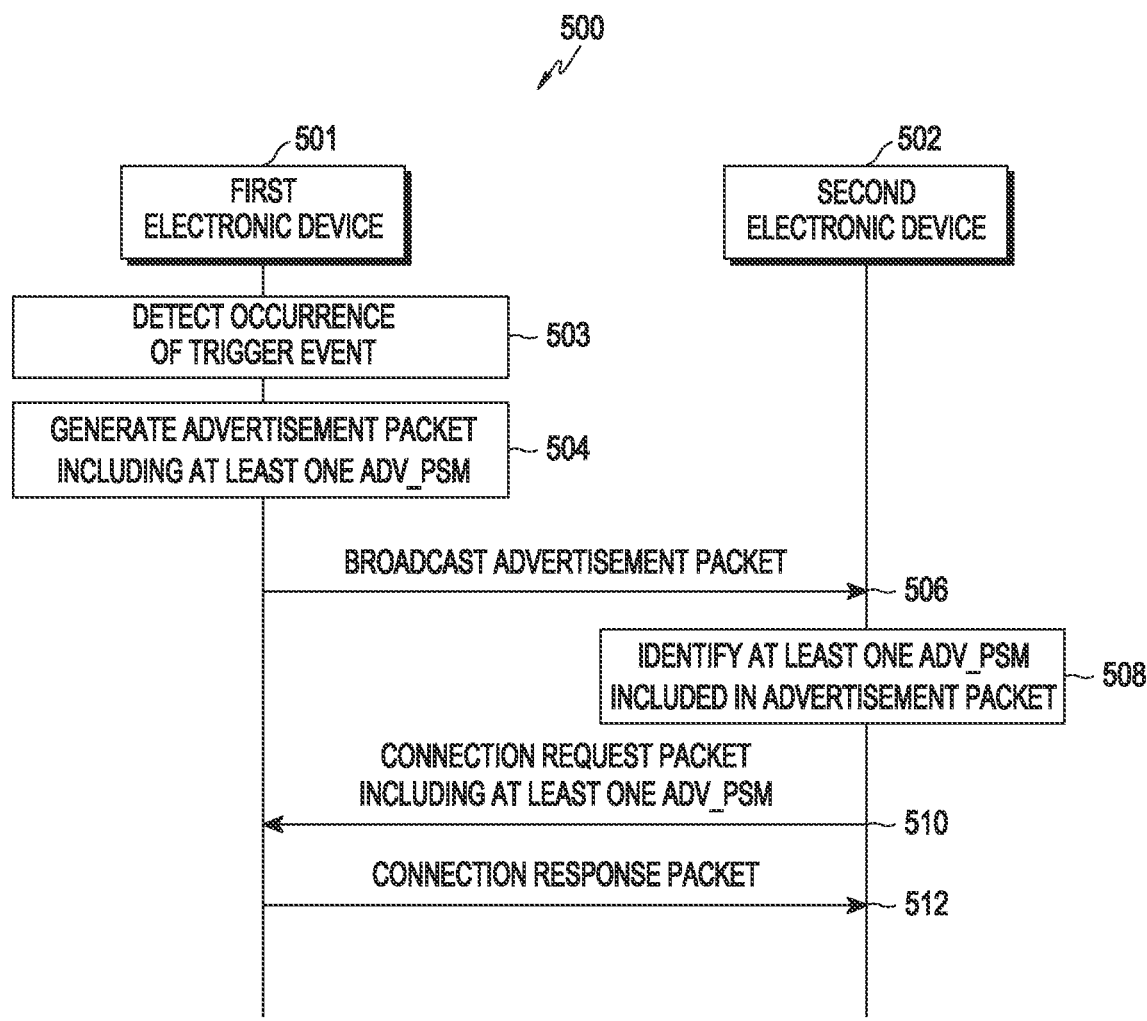
FIG. 5 is a signal flowchart schematically illustrating an operation of connecting electronic devices in a BLE network according to an embodiment of the disclosure.

FIG. 5 is a signal flowchart 500 schematically illustrating an operation of connecting electronic devices in a BLE network according to an embodiment of the disclosure.

In FIG. 5, a first electronic device 501 may be an electronic device providing a service, and a second electronic device 502 may be an electronic device receiving a service. The first electronic device 501 and/or the second electronic device 502 may be, e.g., substantially the same electronic device as the electronic device 101 of FIG. 1.

Referring to FIG. 5, in operation 503, the first electronic device 501 may detect occurrence of a trigger event capable of transmitting an advertisement packet. In an embodiment of the disclosure, the trigger event may include an event related to at least one of changing the screen power state of the first electronic device 501, changing the Wi-Fi connection state of the first electronic device 501, changing the call state of the first electronic device 501, changing the operation state of the second electronic device 502, or executing an application of the first electronic device 501.

In an embodiment of the disclosure, the first electronic device 501 may allocate at least one ADV_PSM to at least one service related to the generated trigger event. For example, the first electronic device 501 may determine a protocol to be used for at least one service and identify assignable port numbers corresponding to the determined protocol. The first electronic device 501 may set at least one unused port number among allocable port numbers as at least one ADV_PSM to be allocated to at least one service.

In an embodiment of the disclosure, port numbers assignable for each protocol may be set differently, and thus at least one ADV_PSM may be used as a protocol identifier. In an embodiment of the disclosure, since the at least one ADV_PSM may be configured differently for each service, the at least one ADV_PSM may be used as a service identifier. According to an embodiment of the disclosure, since the port number has a different allocable range for each protocol, when at least one ADV_PSM is identified, the protocol to be used may be identified. According to an embodiment of the disclosure, because a different port number is assigned for each service, when at least one ADV_PSM is identified, an available service may be identified.

In operation 504, the first electronic device 501 may generate an advertisement packet including at least one configured ADV_PSM. In an embodiment of the disclosure, the advertisement packet may further include at least one of additional service information (e.g., at least one of service ID information, service type information, service name information, service provider information, or service description information) or information related to the first electronic device 501 (e.g., at least one of the company ID that manufactured the first electronic device 501, name information about the first electronic device 501, user information about the first electronic device 501, or user account information about the first electronic device 501), together with at least one configured ADV_PSM. In an embodiment of the disclosure, the advertisement packet may further include information indicating that the advertisement packet is a connectable and scannable non-directional advertisement type. The connectable and scannable non-directional advertisement type may be, e.g., the type indicating that it is possible for the external electronic device (e.g., the second electronic device 502) receiving an advertisement packet to perform the connection operation with respect to the first electronic device 501.

In operation 506, the first electronic device 501 may broadcast the generated advertisement packet.

In an embodiment of the disclosure, the advertisement packet broadcast by the first electronic device 501 may be received by the second electronic device 502. The second electronic device 502 may be an external electronic device that performs a scan operation for receiving an advertisement packet. In an embodiment of the disclosure, the scan operation that may be performed by the second electronic device 502 may include an active scan operation.

According to an embodiment of the disclosure, in the active scan operation, when receiving the advertisement packet, the second electronic device 502 may notify the first electronic device 501 that the advertisement packet has been received. In an embodiment of the disclosure, when receiving the advertisement packet, the second electronic device 502 may transmit a scan request packet including information indicating that the advertisement packet has been received to the first electronic device 501. Upon receiving the scan request packet, the first electronic device 501 may transmit a scan response packet corresponding to the scan request packet to the second electronic device 502.

In operation 508, the second electronic device 502 may identify at least one ADV_PSM included in the received advertisement packet. In an embodiment of the disclosure, the second electronic device 502 may further identify additional service information included in the received advertisement packet. Since the second electronic device 502 may obtain at least one ADV_PSM from the received advertisement packet or may obtain additional service information with the at least one ADV_PSM, an operation for searching for the service information may be omitted.

In an embodiment of the disclosure, the second electronic device 502 may determine whether to perform a connection operation with the first electronic device 501, based on at least one ADV_PSM obtained from the received advertisement packet or additional service information with the at least one ADV_PSM. When the second electronic device 502 determines to perform the connection operation with the first electronic device 501, in operation 510, the second electronic device 502 may transmit, to the first electronic device 501, a connection request packet including at least one ADV_PSM which is the same as the at least one ADV_PSM included in the received advertisement packet.

In an embodiment of the disclosure, the connection request packet may be a credit-based connection request (e.g., L2CAP_LE_CREDIT_BASED_CONNECTION_REQ) packet for requesting channel generation between the first electronic device 501 and the second electronic device 502.

In an embodiment of the disclosure, the connection request packet may further include at least one of an ADV_PSM field, a code information field, an identifier information field, a length information field, a source CID information field, a maximum transmission unit (MTU) information field, a maximum protocol data unit (PDU) payload size (MPS) information field, or an initial credit information field.

In an embodiment of the disclosure, the ADV_PSM field may include information indicating at least one ADV_PSM.

In an embodiment of the disclosure, the code information field may include code information indicating that the corresponding packet is a connection request packet.

In an embodiment of the disclosure, the identifier information field may include identifier information used to determine whether a connection response packet for the connection request packet is received. For example, when the connection response packet including the same identifier information as the identifier information included in the connection request packet is received, the second electronic device 502 may identify the received connection response packet as the connection response packet for the connection request packet transmitted by the second electronic device 502.

In an embodiment of the disclosure, the length information field may include length information about at least one remaining field except for the length information field, identifier information field, and code information field included in the connection request packet.

In an embodiment of the disclosure, when the second electronic device 502 is connected to the first electronic device 501, the source CID information field may include information indicating the channel that may be used for data packet transmission and/or reception with the first electronic device 501. According to an embodiment of the disclosure, the channel that may be used for data packet transmission and/or reception with the first electronic device 501 may be any one channel that is not used among the established channels (e.g., 0x0040-0xFFFF).

In an embodiment of the disclosure, the MTU information field may include information indicating a size of a maximum service data unit (SDU) that the second electronic device 502 may receive.

According to an embodiment of the disclosure, since the minimum SDU size that the second electronic device 502 may receive may be set, the information about the minimum SDU size that the second electronic device 502 may receive may not be included in the connection request packet. In an embodiment of the disclosure, the minimum SDU size that the second electronic device 502 may receive may be 23 bytes.

In an embodiment of the disclosure, the MPS information field may include information indicating the maximum PDU payload size that the second electronic device 502 may receive. The maximum PDU payload size may be, e.g., 65533 bytes.

According to an embodiment of the disclosure, since the minimum PDU payload size that the second electronic device 502 may receive may be set, the information about the minimum PDU payload size that the second electronic device 502 may receive may not be included in the connection request packet. In an embodiment of the disclosure, the minimum PDU payload size that the second electronic device 502 may receive may be 23 bytes.

In an embodiment of the disclosure, the initial credit information field may include frame number information indicating the number of frames that the first electronic device 501 may transmit to the second electronic device 502. For example, the number of frames information may be set to one value within a set range (e.g., 0 to 65535) to indicate the number of frames that the first electronic device 501 may transmit to the second electronic device 502.

Table 1 shows examples of fields that may be included in a connection request packet and values set for each field, according to an embodiment.

TABLE 1

| field | value |
| --- | --- |
| ADV_PSM | 0X0080 |
| code information | 0X14 |
| identifier information | 2 |
| length information | 10 |
| source CID information | 0X0041 |
| MTU information | 65535 bytes |
| MPS information | 251 bytes |
| initial credit information | 65535 |

Referring to Table 1, the connection request packet according to an embodiment may include "0X0080" as information indicating ADV_PSM. The connection request packet according to an embodiment may further include the following information. The connection request packet according to an embodiment may further include at least one of "0X14" which is code information indicating the connection request packet, "2" which is identifier information used to identify whether a connection response packet to the connection request packet is received, "10" which length information about at least one remaining field except for the length information field, identifier information field, and code information field included in the connection request packet, "0X0041" which is source CID information, "65535 bytes" which are MTU information, "251 bytes" which are MPS information, or "65535" which is initial credit information.

Although not illustrated in FIG. 5, according to an embodiment of the disclosure, the first electronic device 501 may transmit a connection response packet to the connection request packet as described above to the second electronic device 502. In an embodiment of the disclosure, the connection response packet may be a credit-based connection response (e.g., L2CAP_LE_CREDIT_BASED_CONNECTION_RSP) packet.

In an embodiment of the disclosure, the connection response packet may include at least one of a code information field, an identifier information field, a length information field, a result information field, a destination CID field, an MTU information field, an MPS information field, or an initial credit information field.

In an embodiment of the disclosure, the code information field may include code information indicating that the code information field is the connection response packet.

In an embodiment of the disclosure, the identifier information field may include the same identifier information as the identifier information included in the connection request packet.

In an embodiment of the disclosure, the length information field may include length information about at least one remaining field except for the length information field, identifier information field, and code information field included in the connection response packet.

In an embodiment of the disclosure, the result information field may include information (e.g., connection acceptance (0X0000) or connection rejection (0X0002)) indicating whether to accept the connection request of the second electronic device 502 by the connection request packet.

In an embodiment of the disclosure, when the first electronic device 501 is connected to the second electronic device 502, the destination CID information field may include information indicating a channel that may be used for data packet transmission and/or reception with the second electronic device 502. According to an embodiment of the disclosure, the channel that may be used for data packet transmission and/or reception with the second electronic device 502 may be any one channel that is not used among the established channels (e.g., 0x0040-0xFFFF).

In an embodiment of the disclosure, the MTU information field may include information indicating the maximum SDU size that the first electronic device 501 may receive.

According to an embodiment of the disclosure, since the minimum SDU size that the first electronic device 501 may receive may be set, the information about the minimum SDU size that the first electronic device 501 may receive may not be included in the connection response packet. In an embodiment of the disclosure, the minimum SDU size that the first electronic device 501 may receive may be 23 bytes.

In an embodiment of the disclosure, the MPS information field may include information indicating the maximum PDU payload size that the first electronic device 501 may receive. The maximum PDU payload size may be, e.g., 65533 bytes.

According to an embodiment of the disclosure, since the minimum PDU payload size that the first electronic device 501 may receive may be set, the information about the minimum PDU payload size that the first electronic device 501 may receive may not be included in the connection response packet. In an embodiment of the disclosure, the minimum PDU payload size that the first electronic device 501 may receive may be 23 bytes.

In an embodiment of the disclosure, the initial credit information field may include frame information indicating the number of frames that the second electronic device 502 may transmit to the first electronic device 501. In an embodiment of the disclosure, the number-of-frames information may be set to one value within a set range (e.g., 0 to 65535) to indicate the number of frames that the second electronic device 502 may transmit to the first electronic device 501.

Table 2 shows examples of fields that may be included in a connection response packet and values set for each field, according to an embodiment.

TABLE 2

| field | value |
| --- | --- |
| code information | 0X15 |
| identifier information | 2 |
| length information | 14 |
| result information | 0X0000 |
| destination CID information | 0X0042 |
| MTU information | 65535 |
| MPS information | 251 bytes |
| initial credit information | 65535 |

Referring to Table 2, the connection response packet may include at least one of "0X15" indicating the connection response packet as code information, "2" which is identifier information used to indicate that it is the connection response packet to the connection request packet, "14" which is length information about the remaining information except for the length information, identifier information, and code information included in the connection response packet, "0X0000" which is information indicating that the connection request of the second electronic device 502 is accepted as result information, "0X0042" which is destination CID information, "65535 bytes" which are MTU information, "251 bytes" which are MPS information, or "65535" which are initial credit information.

Referring back to FIG. 5, in operation 512, the first electronic device 501 may establish a communication channel for data packet transmission and/or reception with the second electronic device 502. In an embodiment of the disclosure, when the first electronic device 501 accepts the connection request with the second electronic device 502, a channel indicated by source CID information (e.g., 0X0041) included in the connection request packet and a channel indicated by destination CID information (e.g., 0X0042) included in the connection response packet may be configured as communication channels. As another example, the first electronic device 501 may newly allocate a channel for communication with the second electronic device 502. In an embodiment of the disclosure, the first electronic device 501 may transmit and/or receive a data packet for providing a service with the second electronic device 502 through the allocated channel.

Although not illustrated in FIG. 5, when at least one ADV_PSM is not included in the received advertisement packet, the second electronic device 502 may perform operations of the second electronic device 462 included in operations 412 to 422 of FIG. 4A or may perform operations of the second electronic device 462 included in operations 432 to 450 of FIG. 4B.

In operations 412 to 422 of FIG. 4A, ADV_PSM or SD_PSM may not be used, and an operation of transmitting and/or receiving a data packet related to a service may be performed based on an ACL connection operation and a GATT-based service search operation.

In operations 432 to 450 of FIG. 4B, an ACL connection operation, a service search operation, a data packet transmission and/or reception operation for obtaining SD_PSM, a connection operation for channel establishment using SD_PSM, and a data packet transmission and/or reception operation related to a service may be performed.

According to an embodiment of the disclosure, the advertisement packet may be transmitted on an advertising physical channel and may be periodically broadcast according to a set advertisement period (e.g., 20 ms to 10.24 s). According to an embodiment of the disclosure, the advertisement packet may have a format as illustrated in FIG. 6.

Figure 6:
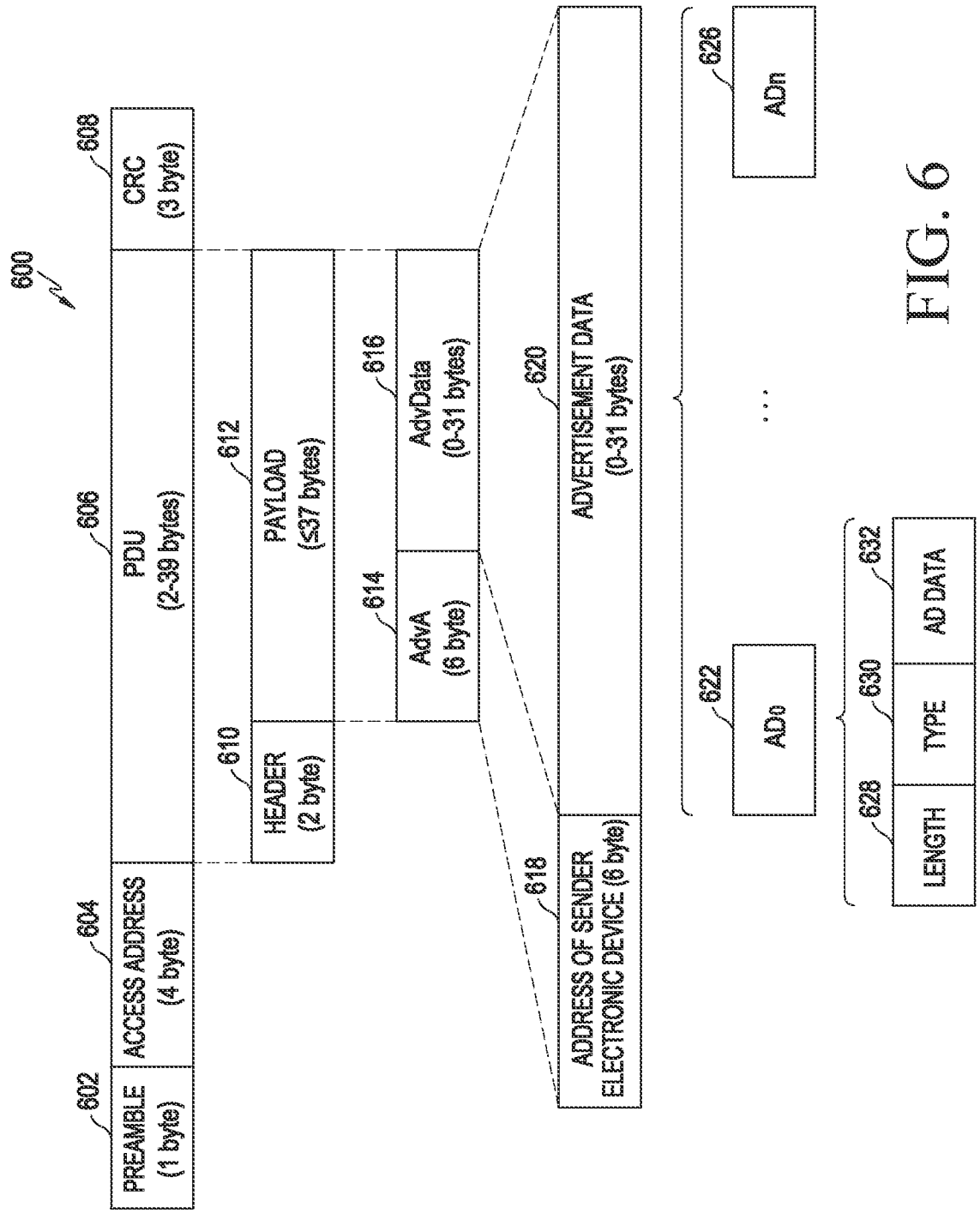
FIG. 6 is a view schematically illustrating an advertisement packet according to an embodiment of the disclosure.

FIG. 6 is a view 600 schematically illustrating an advertisement packet format according to an embodiment of the disclosure.

Referring to FIG. 6, an advertisement packet according to various embodiments may include a preamble field 602, an access address field 604, a PDU field 606, and/or a cyclic redundancy check (CRC) field 608.

In an embodiment of the disclosure, the preamble field 602 may include one-byte information used to perform frequency synchronization and/or symbol timing estimation in the external electronic device (e.g., the external electronic device 102) receiving the advertisement packet. In an embodiment of the disclosure, the preamble field 602 may include a fixed one-byte sequence configured in the form of alternating bits of 0 and 1, based on address information included in the access address field 604. For example, the preamble field 602 may include "101010" when address information included in the access address field 604 starts with 1, and may include "01010101" when address information included in the access address field 604 starts with 0.

In an embodiment of the disclosure, the access address field 604 may include 4-byte address information for the advertisement packet.

In an embodiment of the disclosure, the PDU field 606 may have a variable length from a minimum of 2 bytes to a maximum of 39 bytes. In an embodiment of the disclosure, the PDU field 606 may include an advertisement physical channel PDU.

In an embodiment of the disclosure, the CRC field 608 may include 3-byte information used to detect an error in the advertisement packet received by the external electronic device.

In an embodiment of the disclosure, the PDU field 606 may include a 2-byte header field 610 and a payload field 612 capable of having a length of up to 37 bytes.

In an embodiment of the disclosure, the header field 610 may include information indicating the type and length of data included in the payload field 612. In an embodiment of the disclosure, the header field 610 may include information indicating that the type of data included in the payload field 612 is advertisement data.

In an embodiment of the disclosure, the payload field 612 may have a variable length of 37 bytes or less, and may include an AdvA field 614 and an AdvData field 616.

In an embodiment of the disclosure, the AdvA field 614 may include an address 618 of the electronic device 101 that has transmitted the advertisement packet. In an embodiment of the disclosure, the address 618 of the electronic device 101 may be the MAC address of the electronic device 101.

In an embodiment of the disclosure, the AdvData field 616 may include up to 31 bytes of advertisement data 620 and may include one or more advertisement data (AD) elements. The one or more AD elements may be, e.g., N AD elements including the AD0 element 622 to the ADN element 626.

In an embodiment of the disclosure, each of the one or more AD elements may include a length field, a type field, and an AD data field. FIG. 6 illustrates a length field 628, a type field 630, and an AD data field 632 included in the $AD_0$ element 622. Although not illustrated in FIG. 6, like the $AD_0$ element 622, the $AD_N$ element 626 may include a length field, a type field, and an AD data field.

In an embodiment of the disclosure, the length field 628 may include length information about the AD data field 632, and the type field 630 may include type information about data included in the AD data field 632. In an embodiment of the disclosure, the type field 630 may include information indicating at least one of data types as shown in Table 3 below.

TABLE 3

| data type | definition |
|---|---|
| universally unique identifier (UUID) | identification information about the service provided by electronic device 101 |
| manufacturer specific data | may include at least one of data defined by the manufacturer of electronic device 101 or data configured by electronic device 101 |
| transmission power level | transmission power level information used for electronic device 101 to transmit advertisement packet |
| slave connection interval range | connection interval range to be used by external electronic device receiving the advertisement packet |
| service solicitation | information about one or more services for reception through external electronic device. used to invite external electronic device for connection |
| service data | data (which may include service UUID) associated with the service provided by electronic device 101 |
| URI (uniform resource identifier) | URI related to the service provided by electronic device 101 |

In an embodiment of the disclosure, the AD data field 632 may include at least one ADV_PSM.

Figure 7A:
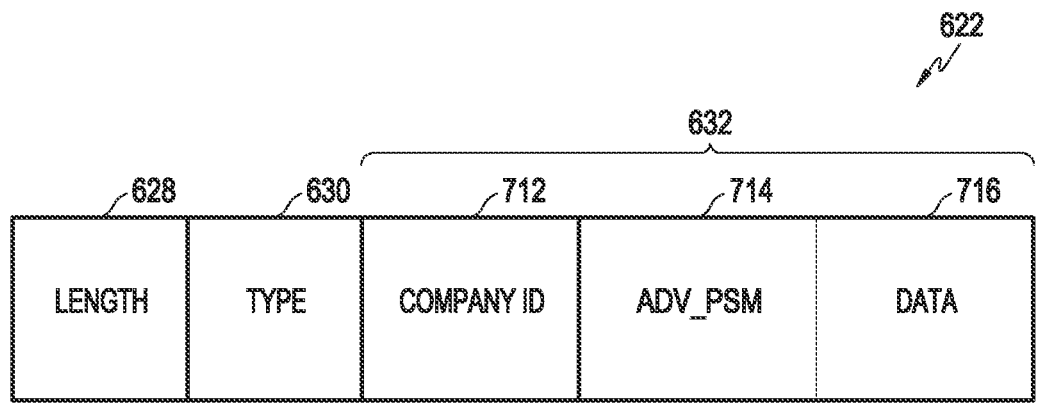
FIGS. 7A and 7B schematically illustrate an $AD_0$ element according to an embodiment of the disclosure.
Figure 7B:
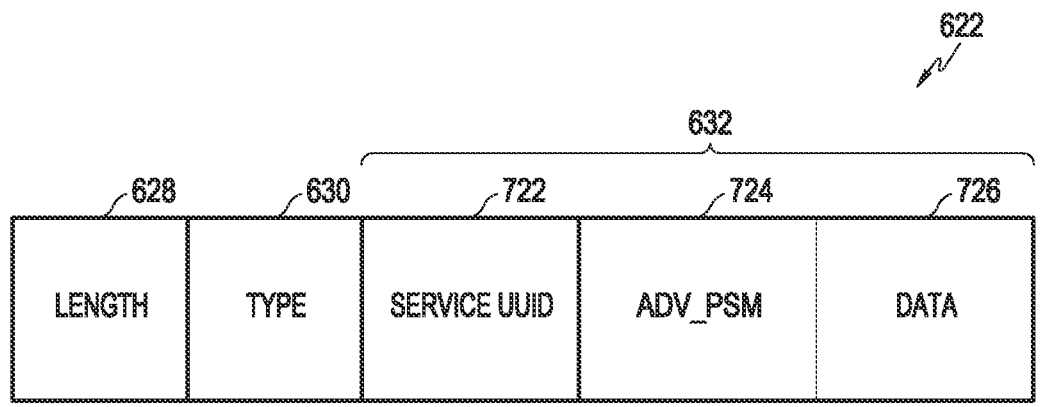

The structure of the $AD_0$ element 622 according to an embodiment is as shown in FIGS. 7A and 7B. Hereinafter, the $AD_0$ element 622 is described as an example with reference to FIGS. 7A and 7B, but the structure of the $AD_0$ element 622 illustrated in FIGS. 7A and 7B may also be applied to the $AD_N$ element 626.

FIGS. 7A and 7B include a view schematically illustrating an $AD_0$ element according to an embodiment of the disclosure.

According to various embodiments of the disclosure, the structure of the $AD_0$ element 622 may be defined by a plurality of formats. In an embodiment of the disclosure, the plurality of formats may include at least one of a format including company ID information or a format including service UUID information.

In an embodiment of the disclosure, the format including the company ID information is as illustrated in FIG. 7A.

Referring to FIG. 7A, according to an embodiment of the disclosure, the $AD_0$ element 622 may include a length field 628, a type field 630, and an AD data field 632.

In an embodiment of the disclosure, the length field 628 may include length information about the AD data field 632. The length information included in the AD data field 632 may be, e.g., 1 byte.

In an embodiment of the disclosure, the type field 630 may include type information about data included in the AD data field 632. The type field 630 may include information indicating one of the data types described in Table 3. Information included in the type field 630 may have, e.g., a length of 1 byte.

FIG. 7A illustrates a type field includes information indicating a manufacturer-specific data type according to an embodiment of the disclosure. When the type field 630 includes information indicating the manufacturer-specific data type, the AD data field 632 may include data configured by the electronic device 101.

In an embodiment of the disclosure, the AD data field 632 may include a company ID field 712 including ID information about the company that manufactured the electronic device 101. The company ID information may be, e.g., 2 bytes long.

In an embodiment of the disclosure, the AD data field 632 may include an ADV_PSM field 714 or a data field 716.

In an embodiment of the disclosure, the ADV_PSM field 714 may include at least one ADV_PSM. One ADV_PSM may have, e.g., a length of 2 bytes, and the length of the ADV_PSM field 714 may be changed based on the number of ADV_PSMs included in the ADV_PSM field 714.

In an embodiment of the disclosure, the data field 716 may include at least one of information related to the electronic device 101 (e.g., name information about the electronic device 101, user information about the electronic device 101, or user account information about the electronic device 101) or service information about the electronic device 101 (e.g., at least one of service ID information, service type information, service name information, service provider information, or service description information). Information included in the data field 716 may have a length of at least 0 bytes to a length of up to 25 bytes.

In an embodiment of the disclosure, the arrangement order of fields included in the AD data field 632 may be changed. For example, FIG. 7A illustrates that the fields are arranged in the order of "company ID field 712+ADV_PSM field 714+data field 716", but the disclosure is not limited thereto, and the arrangement order of the fields included in the AD data field 632 may be changed. For example, the data field 716 may be disposed ahead of the ADV_PSM field 714, or the ADV_PSM field 714 may be disposed ahead of the company ID field 712.

FIG. 7B is a view illustrating a format including a service UUID capable of defining a structure of an $AD_0$ element according to an embodiment of the disclosure.

Referring to FIG. 7B, according to an embodiment of the disclosure, the $AD_0$ element 622 may include a length field 628, a type field 630, and an AD data field 632.

In an embodiment of the disclosure, the length field 628 may include length information about the AD data field 632. Information included in the length field 622 may have, e.g., a length of 1 byte.

In an embodiment of the disclosure, the type field 630 may include type information about data included in the AD data field 632. Information included in the type field 630 may have, e.g., a length of 1 byte. In an embodiment of the disclosure, the type field 630 may include information indicating at least one of data types as in Table 3 described above.

FIG. 7B illustrates a type field includes information indicating a manufacturer-specific data type according to an embodiment of the disclosure.

In an embodiment of the disclosure, the AD data field 632 may include a service UUID field 722 including service UUID information for identifying the service provided by the electronic device 101. The service UUID information may include, e.g., information about one of a 16-bit (2-byte) service UUID, a 32-bit (4-byte) service UUID, or a 128-bit (16-byte) service UUID.

In an embodiment of the disclosure, the AD data field 632 may include an ADV_PSM field 724 or a data field 726.

In an embodiment of the disclosure, the ADV_PSM field 724 may include at least one ADV_PSM.

In an embodiment of the disclosure, the data field 726 may include at least one of service information (e.g., at least one of service type information, service name information, service provider information, or service description information) about the electronic device 101 or information (e.g., name information about the electronic device 101, user information about the electronic device 101, or user account information about the electronic device 101) related to the electronic device 101. The data field 726 may have a variable length, and may have, e.g., a length of at least 0 bytes to a maximum of 24 bytes.

In an embodiment of the disclosure, the arrangement order of fields included in the AD data field 632 may be changed. For example, FIG. 7B illustrates that the fields are arranged in the order of "service UUID field 722+ADV_PSM field 724+data field 726", but the disclosure is not limited thereto, and the arrangement order of the fields included in the AD data field 632 may be changed. For example, the data field 726 may be disposed ahead of the ADV_PSM field 724, or the ADV_PSM field 724 may be disposed ahead of the service UUID field 722.

According to an embodiment of the disclosure, the AD data field 632 may be formed in a format including company ID information, service UUID information, and ADV_PSM, in addition to the formats shown in FIGS. 7A and 7B.

Figure 8:
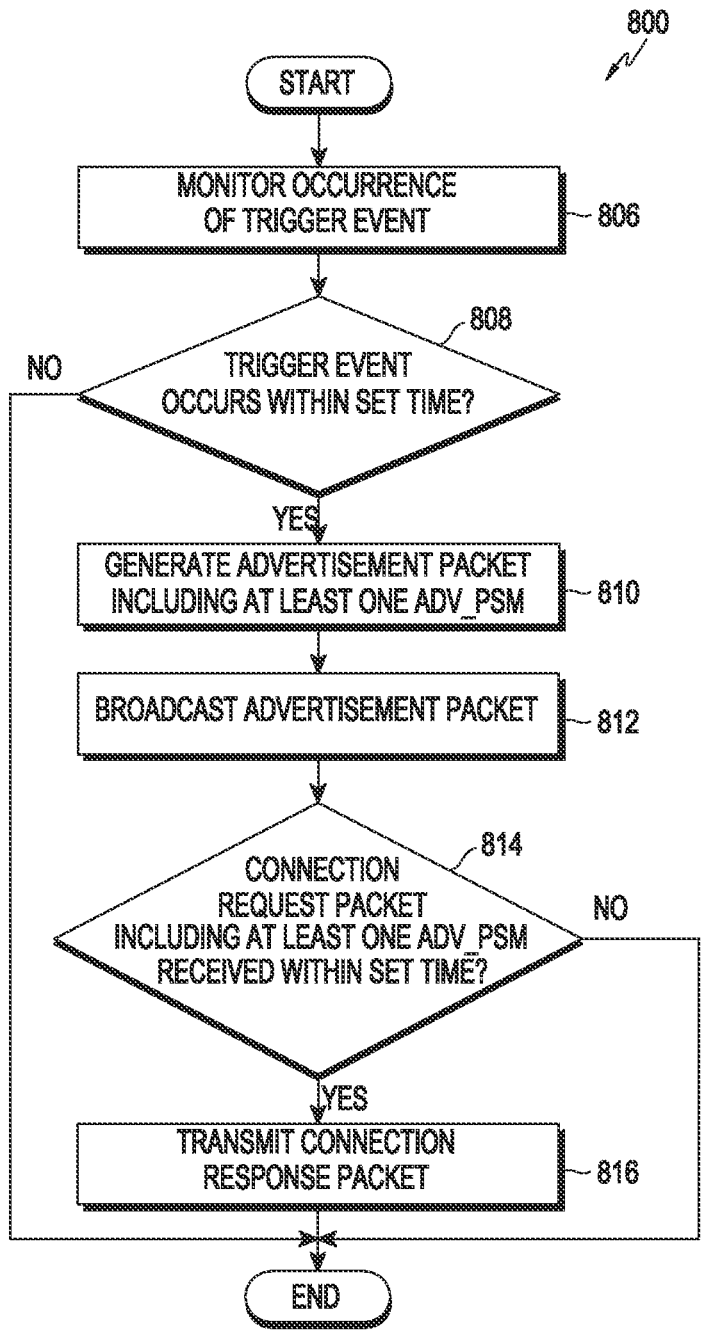
FIG. 8 is a flowchart illustrating an operation of providing an advertisement protocol service multiplexer (ADV_PSM)-allocated service by an electronic device in a BLE network according to an embodiment of the disclosure.

FIG. 8 is a flowchart 800 illustrating an operation of providing an ADV_PSM-allocated service by an electronic device in a BLE network according to an embodiment of the disclosure.

Referring to FIG. 8, in operation 806, the processor 240 may monitor occurrence of a trigger event for determining whether to generate an advertisement packet. In an embodiment of the disclosure, the processor 240 may monitor whether a trigger event occurs within a set time from the start of the monitoring operation. For example, the trigger event may include an event related to at least one of changing the screen power state of the electronic device 101, changing the Wi-Fi connection state of the electronic device 101, changing the call state of the electronic device 101, changing the operation state of the external electronic device (e.g., the external electronic device 102), or executing an application of the electronic device 101.

In operation 808, when the occurrence of the trigger event is not detected within a set time from the start of the monitoring operation, the processor 240 may terminate the operation.

In operation 810, when the occurrence of the trigger event is detected within the set time from the start of the monitoring operation, the processor 240 may allocate at least one ADV_PSM to at least one service related to the generated trigger event and generate an advertisement packet including the allocated at least one ADV_PSM. In operation 812, the processor 240 may broadcast the generated advertisement packet.

In operation 814, the processor 240 may detect whether a connection request packet including at least one ADV_PSM is received within the set time from the time point at which the advertisement packet is broadcast. The connection request packet including at least one ADV_PSM may be the connection request packet for the external electronic device to request connection with the electronic device 101.

In operation 814, when the connection request packet including the at least one ADV_PSM is not received within the set time from the time point at which the advertisement packet is broadcast, the processor 240 may terminate the operation.

In operation 814, when the connection request packet including at least one ADV_PSM is received within the set time from the time point at which the advertisement packet is broadcast, the processor 240 may detect whether the at least one ADV_PSM included in the received connection request packet is the same as the at least one ADV_PSM included in the broadcast advertisement packet. When the processor 240 detects that the at least one ADV_PSM included in the received connection request packet is the same as the at least one ADV_PSM included in the broadcast advertisement packet, the processor 240 may accept the connection request based on the received connection request packet. When the processor 240 detects that the at least one ADV_PSM included in the received connection request packet is different from the at least one ADV_PSM included in the broadcast advertisement packet, the processor 240 may reject the connection request based on the received connection request packet.

In an embodiment of the disclosure, the processor 240 may generate a connection response packet including information about whether to accept or reject the connection request based on the received connection request packet. The processor 240 may transmit the generated connection response packet to the external electronic device in operation 816.

In an embodiment of the disclosure, the processor 240 may transmit a connection response packet including information indicating that the connection request is accepted, and may establish the channel for communication with the external electronic device. For example, the processor 240 may allocate at least one channel and may set the allocated at least one channel as a channel for communication with an external electronic device. In an embodiment of the disclosure, the processor 240 may transmit information about the established channel to the external electronic device.

As another example, although the processor 240 does not transmit information about the established communication channel, upon receiving the connection response packet, the external electronic device may set at least one of the channels corresponding to the destination CID information included in the connection response packet or the channel corresponding to the source CID information included in the connection request packet as the channel for communication with the electronic device 101.

In an embodiment of the disclosure, the established channel between the electronic device 101 and the external electronic device may be used for data packet transmission and/or reception operations between the electronic device 101 and the external electronic device.

Figure 9:
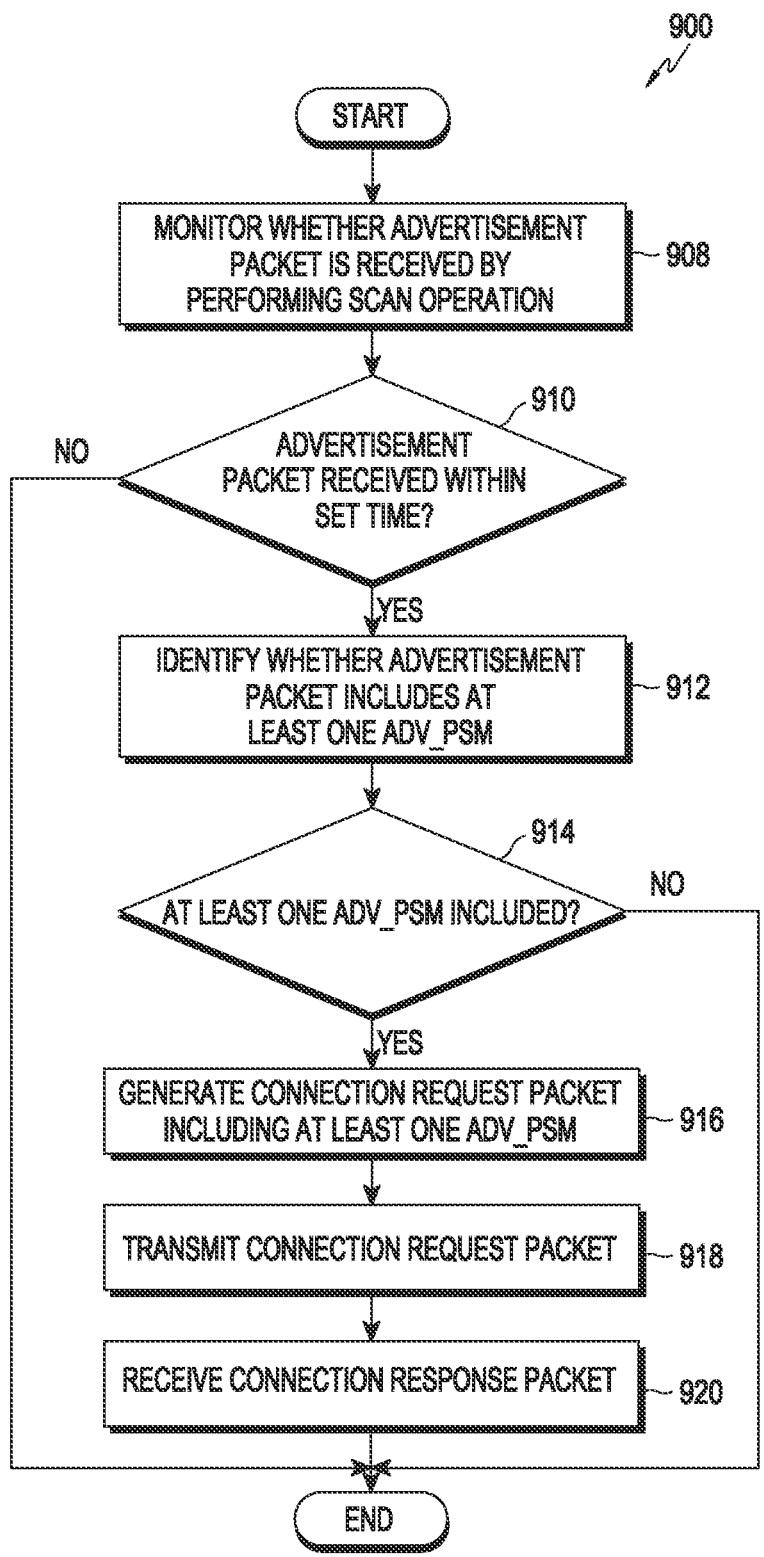
FIG. 9 is a flowchart illustrating an operation of receiving an ADV_PSM-allocated service by an electronic device in a BLE network according to an embodiment of the disclosure.

FIG. 9 is a flowchart 900 illustrating an operation in which an electronic device receives a service to which ADV_PSM is allocated in a BLE network according to an embodiment of the disclosure.

Referring to FIG. 9, in operation 908, the processor 240 may monitor whether an advertisement packet is received by performing a scan operation. In an embodiment of the disclosure, the scan operation may be performed for a set time.

In operation 910, the processor 240 may determine whether the broadcast advertisement packet is received within a set time. In an embodiment of the disclosure, if the broadcast advertisement packet is not received within the set time, the processor 240 may terminate the operation.

In an embodiment of the disclosure, when receiving the advertisement packet broadcast within the set time, in operation 912, the processor 240 may identify whether at least one ADV_PSM is included in the received advertisement packet. In an embodiment of the disclosure, the processor 240 may identify whether the received advertisement packet is related to the service to be used and/or whether the received advertisement packet is broadcast from the electronic device providing the service to be used, and may identify whether at least one ADV_PSM is included in the received advertisement packet.

In an embodiment of the disclosure, the processor 240 may obtain at least one of the company ID or the service UUID from the received advertisement packet. For example, when the company ID is obtained from the received advertisement packet, the processor 240 may identify whether the ID is the same as the ID of the electronic device providing the service to be used by the electronic device indicated by the obtained company ID. The ID of the electronic device providing the service to be used may be stored in the memory 230. When the ID is the same as the ID of the electronic device providing the service to be used by the electronic device indicated by the obtained company ID, the processor 240 may identify whether at least one ADV_PSM is included in the received advertisement packet.

In another example, when the processor 240 obtains the service UUID from the received advertisement packet, the processor 240 may identify whether the obtained service UUID is a UUID related to the service to be used. The UUID related to the service to be used may be stored in the memory 230. When the obtained service UUID is the UUID related to the service to be used, the processor 240 may identify whether at least one ADV_PSM is included in the received advertisement packet.

In operation 914, when it is identified that at least one ADV_PSM is not included in the received advertisement packet, the processor 240 may terminate the operation illustrated in FIG. 9 and may perform the operations illustrated in FIG. 4A or 4B.

When it is identified that at least one ADV_PSM is included in the received advertisement packet in operation 914, the processor 240 may generate a connection request packet including at least one ADV_PSM obtained from the received advertisement packet in operation 916.

In operation 918, the processor 240 may transmit the generated connection request packet to the external electronic device (e.g., the first electronic device 501 of FIG. 5) that has broadcast the advertisement packet through the communication circuit 220. In an embodiment of the disclosure, the processor 240 may transmit the generated connection request packet to the external electronic device through the communication circuit 220, based on information about the external electronic device included in the advertisement packet (e.g., at least one of the MAC address of the external electronic device, the company ID of the external electronic device, or the name of the external electronic device).

In operation 920, the processor 240 may receive a connection response packet to the connection request packet from the external electronic device. In an embodiment of the disclosure, when the received connection response packet includes information indicating that the connection request is accepted, the processor 240 may establish at least one channel for communicating with the external electronic device.

In an embodiment of the disclosure, the processor 240 may receive information about at least one channel allocated by the external electronic device from the external electronic device, and may set the at least one channel as a channel for communication with the external electronic device based on the received information.

In an embodiment of the disclosure, the processor 240 may transmit and/or receive a data packet to and/or from an external electronic device through at least one established channel. As another example, the processor 240 may set at least one of a channel corresponding to the source CID information included in the connection request packet or a channel corresponding to the destination CID information included in the connection response packet as a channel for communication with the external electronic device.

Figure 10A:
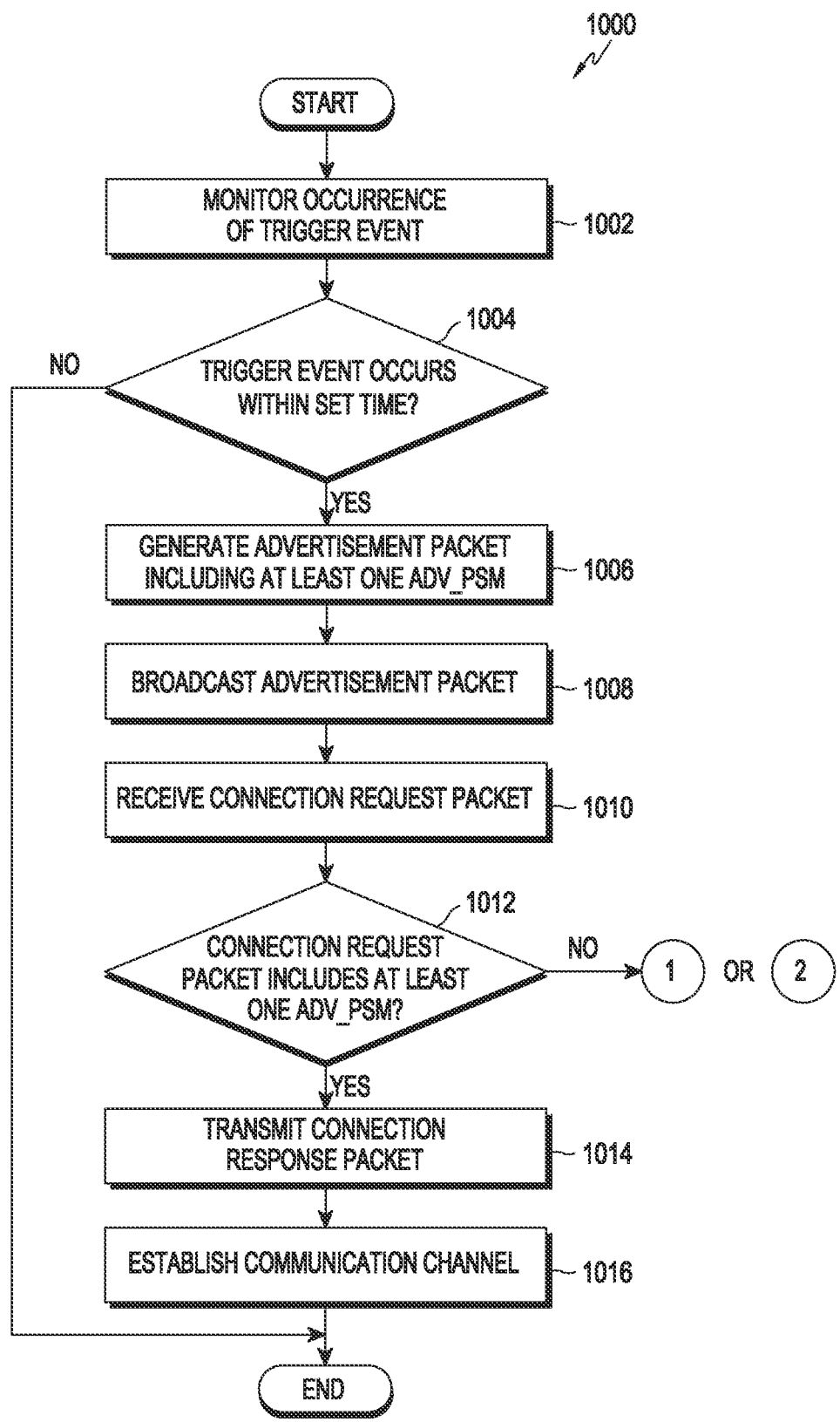
FIGS. 10A, 10B, and 10C are flowcharts illustrating an operation of providing a service by an electronic device in a BLE network according to an embodiment of the disclosure.
Figure 10B:
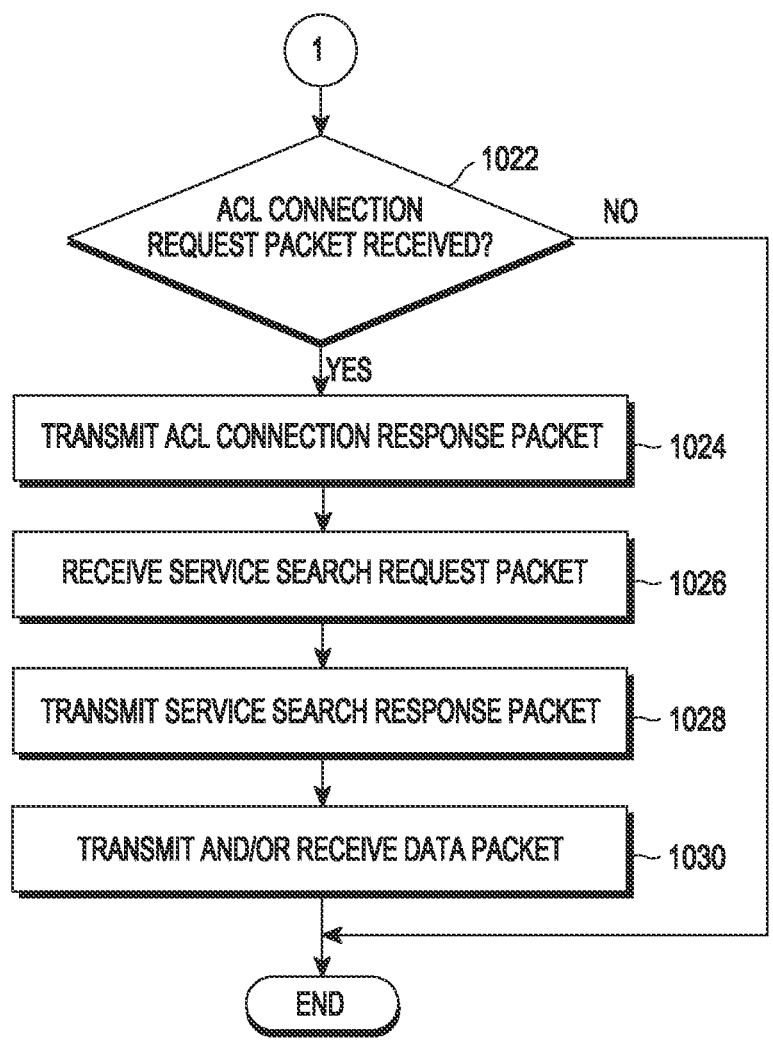
Figure 10C:
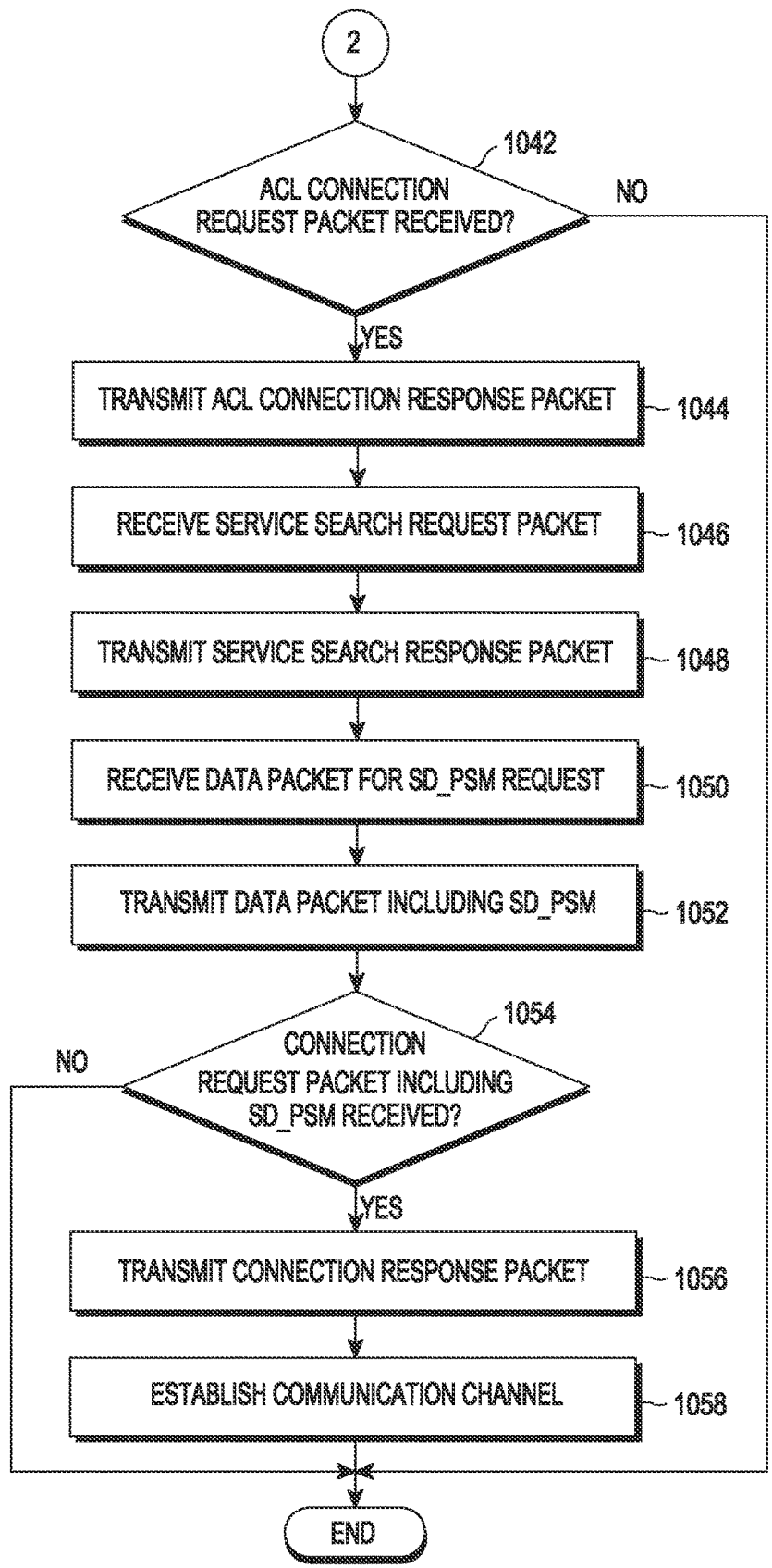

FIGS. 10A, 10B, and 10C are flowcharts 1000 illustrating an operation in which an electronic device provides a service in a BLE network according to various embodiments of the disclosure.

Referring to FIG. 10A, in operation 1002, the processor 240 may monitor whether a trigger event for determining whether to generate an advertisement packet occurs. In an embodiment of the disclosure, the processor 240 may monitor whether a trigger event occurs within a set time from the start of the monitoring operation. For example, the trigger event may include an event related to at least one of changing the screen power state of the electronic device 101, changing the Wi-Fi connection state of the electronic device 101, changing the call state of the electronic device 101, changing the operation state of the external electronic device (e.g., the external electronic device 102), or executing an application of the electronic device 101.

In operation 1004, when the occurrence of the trigger event is not detected within a set time from the start of the monitoring operation, the processor 240 may terminate the operation.

In operation 1004, when the occurrence of the trigger event is detected within the set time from the start of the monitoring operation, the processor 240 may allocate at least one ADV_PSM to at least one service related to the generated trigger event.

In operation 1006, the processor 240 may generate an advertisement packet including at least one allocated ADV_PSM, and may broadcast the generated advertisement packet through the communication circuit 220 in operation 1008.

In an embodiment of the disclosure, at least one ADV_PSM may be used to establish a connection for using at least one service provided by the electronic device 101. The processor 240 may broadcast the advertisement packet through the communication circuit 220 and wait for reception of the connection request packet.

In operation 1010, the processor 240 may receive a connection request packet through the communication circuit 220. In an embodiment of the disclosure, the connection request packet may be received from an external electronic device (e.g., the external electronic device 102) that performs a scan operation to receive the advertisement packet.

In operation 1012, the processor 240 may detect whether at least one ADV_PSM is included in the connection request packet received from the external electronic device. For example, the processor 240 may detect whether the received connection request packet includes at least one ADV_PSM which is the same as the at least one ADV_PSM included in the broadcast advertisement packet.

In operation 1014, when it is detected that the received connection request packet includes at least one ADV_PSM identical to the at least one ADV_PSM included in the broadcast advertisement packet, the processor 240 may transmit the connection response packet to the external electronic device through the communication circuit 220. In an embodiment of the disclosure, the connection response packet may include information indicating that the connection request of the external electronic device is accepted.

In operation 1016, the processor 240 may establish at least one channel for communication with the external electronic device. For example, the at least one channel may be at least one channel allocated by the processor 240. As another example, the at least one channel may be at least one of a channel corresponding to source CID information included in the connection request packet or a channel corresponding to destination CID information included in the connection response packet. In an embodiment of the disclosure, the processor 240 may transmit and/or receive at least one data packet related to the service with the external electronic device through the communication circuit 220 on at least one established channel.

In operation 1012, when it is detected that at least one ADV_PSM is not included in the connection request packet received from the external electronic device, the processor 240 may perform at least one of operation 1022 of FIG. 10B followed by ①  of FIG. 10A or operation 1042 of FIG. 10C followed by ② of FIG. 10A.

Referring to FIG. 10B, when it is detected that ADV_PSM is not included in the received connection request packet, the processor 240 may identify whether the connection request packet received in operation 1022 is an ACL connection request packet received in the established channel. In an embodiment of the disclosure, the established channel may be a channel having a CID of 0X0004, and may be different from a channel (e.g., a channel having a CID of 0X0005) through which the connection request packet including at least one ADV_PSM may be received.

When it is identified that the received connection request packet is the ACL connection request packet in operation 1022, the processor 240 may transmit the ACL connection response packet to the external electronic device through the communication circuit 220 in operation 1024. In an embodiment of the disclosure, the ACL connection response packet may include information indicating that the external electronic device (e.g., the second electronic device 402 of FIG. 4A) accepts the connection request.

In operation 1026, the processor 240 may receive the service search request packet from the external electronic device through the communication circuit 220. The service search request packet may include information for requesting to provide information about one or more services provided by the electronic device 101.

In operation 1028, the processor 240 may transmit the service search response packet to the external electronic device through the communication circuit 220 in response to the service search request packet. In an embodiment of the disclosure, the service search response packet may include service list information.

In an embodiment of the disclosure, the service list information may include information about one or more services provided by the electronic device 101. The information about the one or more services may include information about whether at least one of a read operation or a write operation may be performed on data related to the service.

In operation 1030, the processor 240 may transmit and/or receive a data packet to and/or from an external electronic device through the communication circuit 220 based on information about one or more services.

For example, when a data packet requesting a read operation for the service-related data is received from the external electronic device, the processor 240 may transmit the data packet including the service-related data to the external electronic device through the communication circuit 220.

As another example, the processor 240 may receive the data packet including data related to the service as data for the write operation from the external electronic device through the communication circuit 220.

Meanwhile, in operation 1042 of FIG. 10C followed by ② of FIG. 10A, when it is detected that ADV_PSM is not included in the received connection request packet, the processor 240 may identify whether the connection request packet received in operation 1022 is an ACL connection request packet received in the established channel. In an embodiment of the disclosure, the established channel may be a channel having a CID of 0X0004, and may be different from a channel (e.g., a channel having a CID of 0X0005) through which the connection request packet including at least one ADV_PSM may be received.

When it is identified that the received connection request packet is the ACL connection request packet in operation 1044, the processor 240 may transmit the ACL connection response packet to the external electronic device through the communication circuit 220 in operation 1024. In an embodiment of the disclosure, the ACL connection response packet may include information indicating that the external electronic device (e.g., the second electronic device 402 of FIG. 4B) accepts the connection request.

In operation 1046, the processor 240 may receive the service search request packet from the external electronic device through the communication circuit 220. The service search request packet may include information for requesting to provide information about one or more services provided by the electronic device 101.

In operation 1048, the processor 240 may transmit the service search response packet to the external electronic device through the communication circuit 220 in response to the service search request packet. In an embodiment of the disclosure, the service search response packet may include service list information.

In operation 1050, the processor 240 may receive a data packet requesting SD_PSM from the external electronic device through the communication circuit 220. In an embodiment of the disclosure, the requested SD_PSM may be related to a service included in the service list information.

In operation 1052, the processor 240 may transmit the data packet including the requested SD_PSM to the external electronic device through the communication circuit 220.

In operation 1054, the processor 240 may identify whether the connection request packet including SD_PSM is received from the external electronic device. When the connection request packet including SD_PSM is not received from the external electronic device, the processor 240 may terminate the operation.

When the connection request packet including SD_PSM is received from the external electronic device, the processor 240 may transmit the connection response packet to the external electronic device in operation 1056. In an embodiment of the disclosure, when the SD_PSM included in the connection request packet is the same as the SD_PSM transmitted to the external electronic device in operation 1052, the processor 240 may transmit the connection response packet to the external electronic device.

In operation 1058, the processor 240 may establish at least one channel for communicating with the external electronic device. In an embodiment of the disclosure, the processor 240 may allocate at least one channel for communicating with the external electronic device, and may transmit information about the allocated at least one channel to the external electronic device through the communication circuit 220. In an embodiment of the disclosure, the processor 240 may transmit and/or receive at least one data packet related to the service with the external electronic device through at least one allocated channel.

Figure 11A:
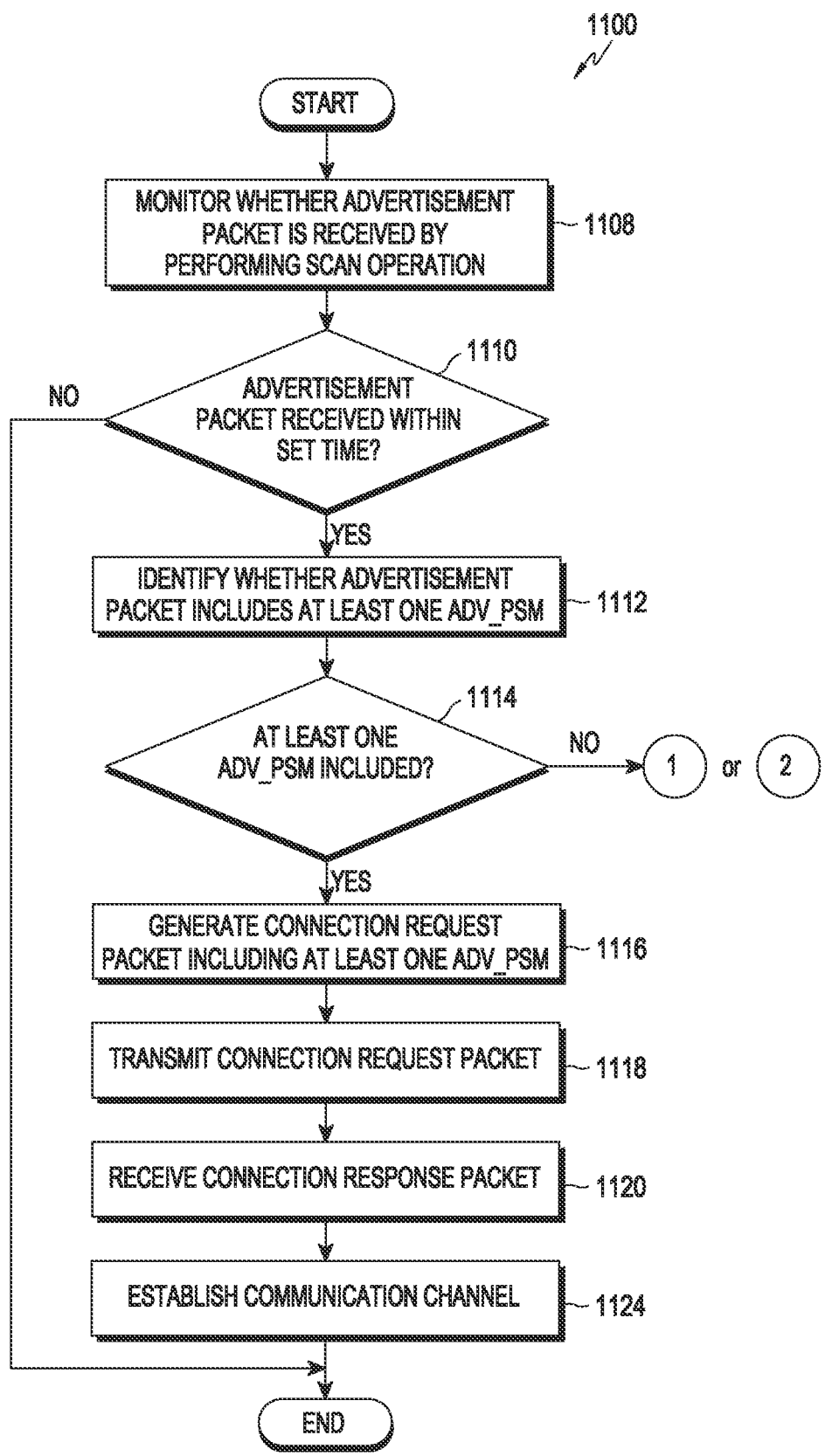
FIGS. 11A, 11B, and 11C are flowcharts illustrating an operation of receiving a service by an electronic device in a BLE network according to an embodiment of the disclosure.
Figure 11B:
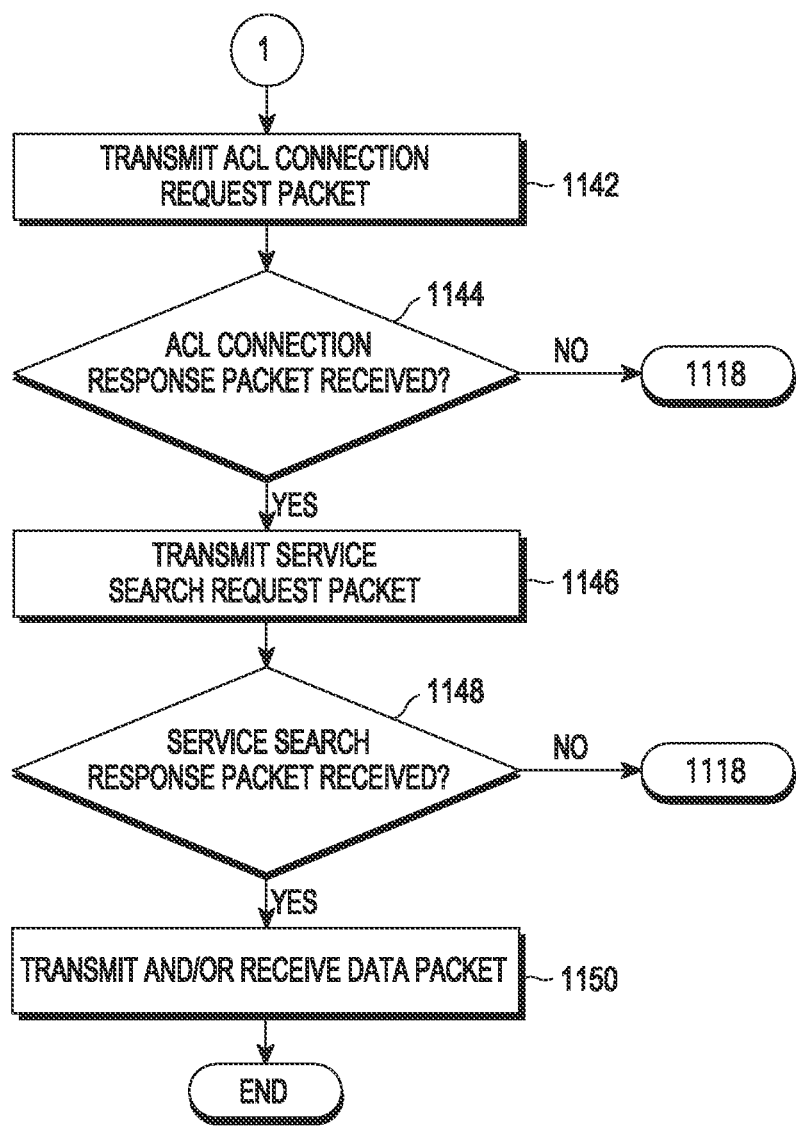
Figure 11C:
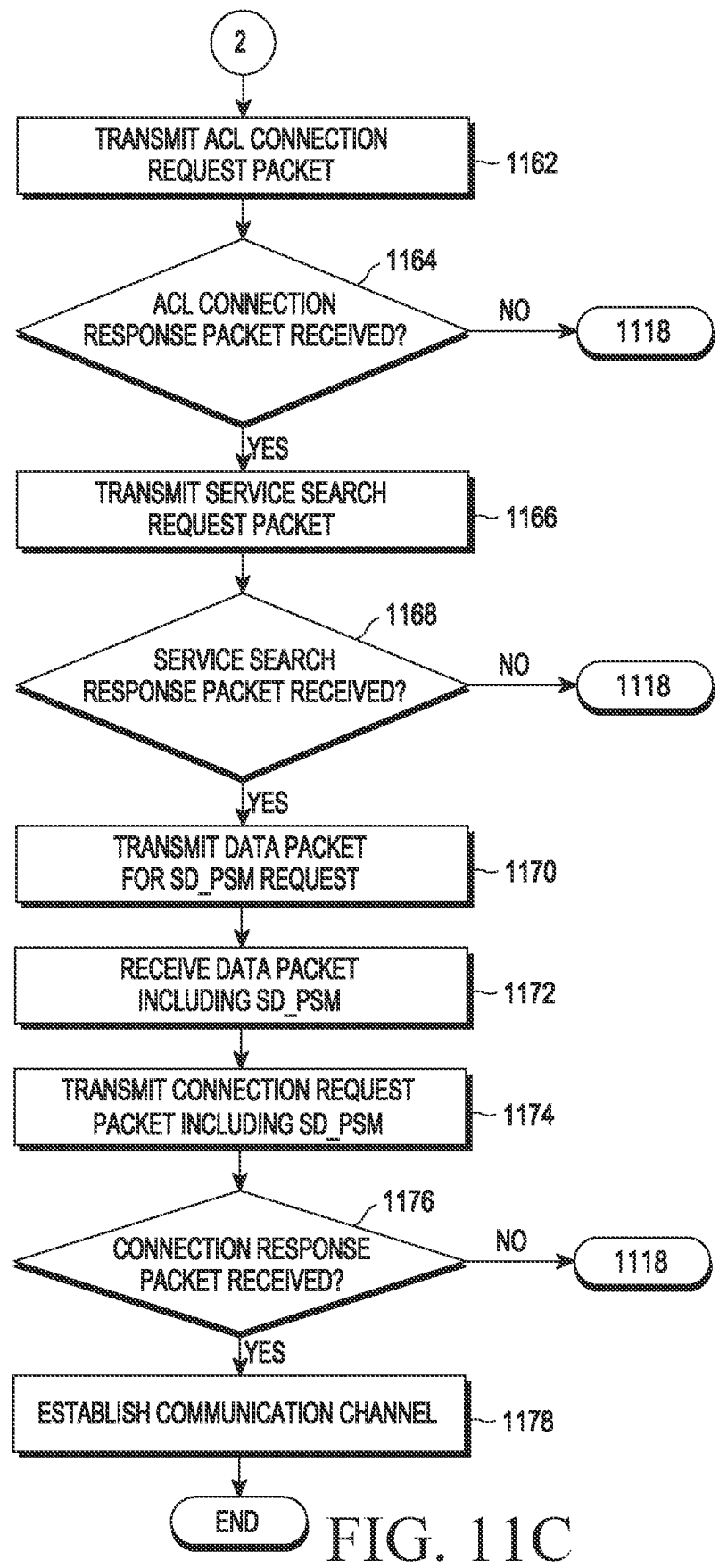

FIGS. 11A, 11B, and 11C are flowcharts 1100 illustrating an operation in which an electronic device (e.g., the second electronic device 502 of FIG. 5) receives a service in a BLE network according to various embodiments of the disclosure.

Referring to FIG. 11A, in operation 1108, the processor 240 may perform a scan operation to monitor whether an advertisement packet broadcast by an external electronic device (e.g., the first electronic device 501 of FIG. 5) is received. In an embodiment of the disclosure, the scan operation may be performed for a set time.

In operation 1110, if the broadcast advertisement packet is not received within the set time, the processor 240 may terminate the operation.

In an embodiment of the disclosure, when receiving the advertisement packet broadcast within the set time, in operation 1112, the processor 240 may identify whether at least one ADV_PSM is included in the received advertisement packet.

In an embodiment of the disclosure, the processor 240 may identify whether the received advertisement packet is related to the service to be used and/or whether the received advertisement packet is broadcast from the electronic device providing the service to be used, and may identify whether at least one ADV_PSM is included in the received advertisement packet.

In an embodiment of the disclosure, the processor 240 may obtain at least one of the company ID or the service UUID from the received advertisement packet. For example, when the company ID is obtained from the received advertisement packet, the processor 240 may identify whether the ID is the same as the ID of the electronic device providing the service to be used by the electronic device indicated by the obtained company ID. The ID of the electronic device providing the service to be used may be stored in the memory 230. When the ID is the same as the ID of the electronic device providing the service to be used by the electronic device indicated by the obtained company ID, the processor 240 may identify whether at least one ADV_PSM is included in the received advertisement packet.

In another example, when the processor 240 obtains the service UUID from the received advertisement packet, the processor 240 may identify whether the obtained service UUID is a UUID related to the service to be used. The UUID related to the service to be used may be stored in the memory 230. When the obtained service UUID is the UUID related to the service to be used, the processor 240 may identify whether at least one ADV_PSM is included in the received advertisement packet.

In operation 1114, when it is identified that at least one ADV_PSM is included in the received advertisement packet, the processor 240 may generate a connection request packet including at least one ADV_PSM in operation 1116.

In operation 1118, the processor 240 may transmit the generated connection request packet to the external electronic device which broadcasts the advertisement packet through the communication circuit 220. In an embodiment of the disclosure, the processor 240 may transmit the generated connection request packet to the external electronic device through the communication circuit 220, based on information about the external electronic device included in the advertisement packet (e.g., at least one of the MAC address of the external electronic device, the company ID of the external electronic device, or the name of the external electronic device).

In an embodiment of the disclosure, when it is detected that at least one ADV_PSM is included in the advertisement packet, the processor 240 may determine whether to use the at least one service provided by the external electronic device based on the information about the at least one service included in the advertisement packet. When the processor 240 determines to use at least one service provided by the external electronic device, the processor 240 may transmit a connection request packet including at least one ADV_PSM to the external electronic device through the communication circuit 220. In an embodiment of the disclosure, the at least one ADV_PSM included in the connection request packet may be the same as the at least one ADV_PSM included in the advertisement packet.

In operation 1120, the processor 240 may receive a connection response packet from an external electronic device through the communication circuit 220. In an embodiment of the disclosure, when the received connection response packet includes information indicating that the connection request is accepted, the processor 240 may determine that the connection with the external electronic device is successful.

In operation 1124, the processor 240 may establish at least one channel for communication with the external electronic device. For example, when information about at least one channel allocated by the external electronic device is received through the communication circuit 220, the processor 240 may establish at least one channel for performing communication with the external electronic device based on the received information. As another example, the processor 240 may set at least one of channels indicated by the source CID or the destination CID included in the connection request packet and the connection response packet including ADV_PSM as a channel for communication with the external electronic device.

Meanwhile, in operation 1114, when it is detected that at least one ADV_PSM is not included in the received advertisement packet, the processor 240 may perform at least one of operation 1122 of FIG. 11B followed by ① of FIG. 11A or operation 1142 of FIG. 11C followed by ② of FIG. 11A.

Referring to FIG. 11B, in operation 1142, the processor 240 may transmit the ACL connection request packet to the external electronic device through the communication circuit 220. In an embodiment of the disclosure, the ACL connection request packet may be transmitted on the established channel, and the established channel may be a channel having the CID of 0X0004.

In operation 1144, the processor 240 may identify whether the ACL connection response packet is received from the external electronic device through the communication circuit 220. In an embodiment of the disclosure, when the ACL connection response packet is not received within a set time, the processor 240 may perform operation 1118 of FIG. 11A (e.g., the operation to monitor whether an advertisement packet is received by performing a scan operation) again.

In an embodiment of the disclosure, when the ACL connection response packet is received within a set time, the processor 240 may transmit the service search request packet to the external electronic device through the communication circuit 220 in operation 1146.

In operation 1148, the processor 240 may identify whether the service search response packet is received from the external electronic device through the communication circuit 220. In an embodiment of the disclosure, when the service search response packet is not received within a set time, the processor 240 may perform operation 1118 of FIG. 11A (e.g., the operation to monitor whether an advertisement packet is received by performing a scan operation) again.

In an embodiment of the disclosure, when a service search response packet is received within a set time, the processor 240 may transmit and/or receive a data packet to and/or from an external electronic device through the communication circuit 220 in operation 1150. In an embodiment of the disclosure, the service search response packet may include service list information.

In an embodiment of the disclosure, the service list information may include information about one or more services provided by the electronic device 101. The information about the one or more services may include information about whether at least one of a read operation or a write operation may be performed on data related to the service. The processor 240 may transmit and/or receive a data packet to and/or from an external electronic device through the communication circuit 220 based on information about one or more services.

For example, when it is detected that the processor 240 may perform the read operation based on the information about the one or more services, the processor 240 may receive a data packet including data related to the service from the external electronic device through the communication circuit 220.

As another example, when it is detected that the processor 240 may perform the write operation based on the information about the one or more services, the processor 240 may transmit a data packet including data related to the service to the external electronic device through the communication circuit 220.

Meanwhile, in operation 1162 of FIG. 11C followed by ②, the processor 240 may transmit the ACL connection request packet to the external electronic device through the communication circuit 220. In an embodiment of the disclosure, the ACL connection request packet may be transmitted on the established channel, and the established channel may be a channel having the CID of 0X0004.

In operation 1164, the processor 240 may identify whether the ACL connection response packet is received from the external electronic device through the communication circuit 220. In an embodiment of the disclosure, when the ACL connection response packet is not received within a set time, the processor 240 may perform operation 1118 of FIG. 11A (e.g., the operation to monitor whether an advertisement packet is received by performing a scan operation) again.

In an embodiment of the disclosure, when the ACL connection response packet is received within a set time, the processor 240 may transmit the service search request packet to the external electronic device through the communication circuit 220 in operation 1166.

In operation 1168, the processor 240 may identify whether the service search response packet is received from the external electronic device through the communication circuit 220. In an embodiment of the disclosure, when the service search response packet is not received within a set time, the processor 240 may perform operation 1118 of FIG. 11A (e.g., the operation to monitor whether an advertisement packet is received by performing a scan operation) again.

In an embodiment of the disclosure, when the service search response packet is received within the set time, the processor 240 may transmit the data packet requesting SD_PSM to the external electronic device through the communication circuit 220 in operation 1170. In an embodiment of the disclosure, the service search response packet may include service list information, and the SD_PSM requested in operation 1170 may be related to a service included in the service list information.

In operation 1172, the processor 240 may receive the data packet including the requested SD_PSM from the external electronic device through the communication circuit 220.

In operation 1174, the processor 240 may transmit a connection request packet including SD_PSM to the external electronic device through the communication circuit 220.

In operation 1176, the processor 240 may identify whether the connection response packet is received within the set time. In an embodiment of the disclosure, when the connection response packet is not received within a set time, the processor 240 may perform operation 1118 of FIG. 11A (e.g., the operation to monitor whether an advertisement packet is received by performing a scan operation) again.

In an embodiment of the disclosure, when the connection response packet is received within the set time and information indicating that the connection request is accepted is included in the received connection response packet, the processor 240 may determine that the connection with the external electronic device is successful.

In operation 1178, the processor 240 may establish at least one communication channel with the external electronic device. For example, when information about at least one communication channel allocated by the external electronic device is received, the processor 240 may establish at least one communication channel based on the received information. As another example, the processor 240 may set at least one of the channel indicated by the source CID information included in the connection request packet or the channel indicated by the destination CID information included in the connection response packet as the communication channel.

In an embodiment of the disclosure, the processor 240 may transmit and/or receive at least one data packet related to the service with the external electronic device through at least one configured communication channel.

Figure 12:
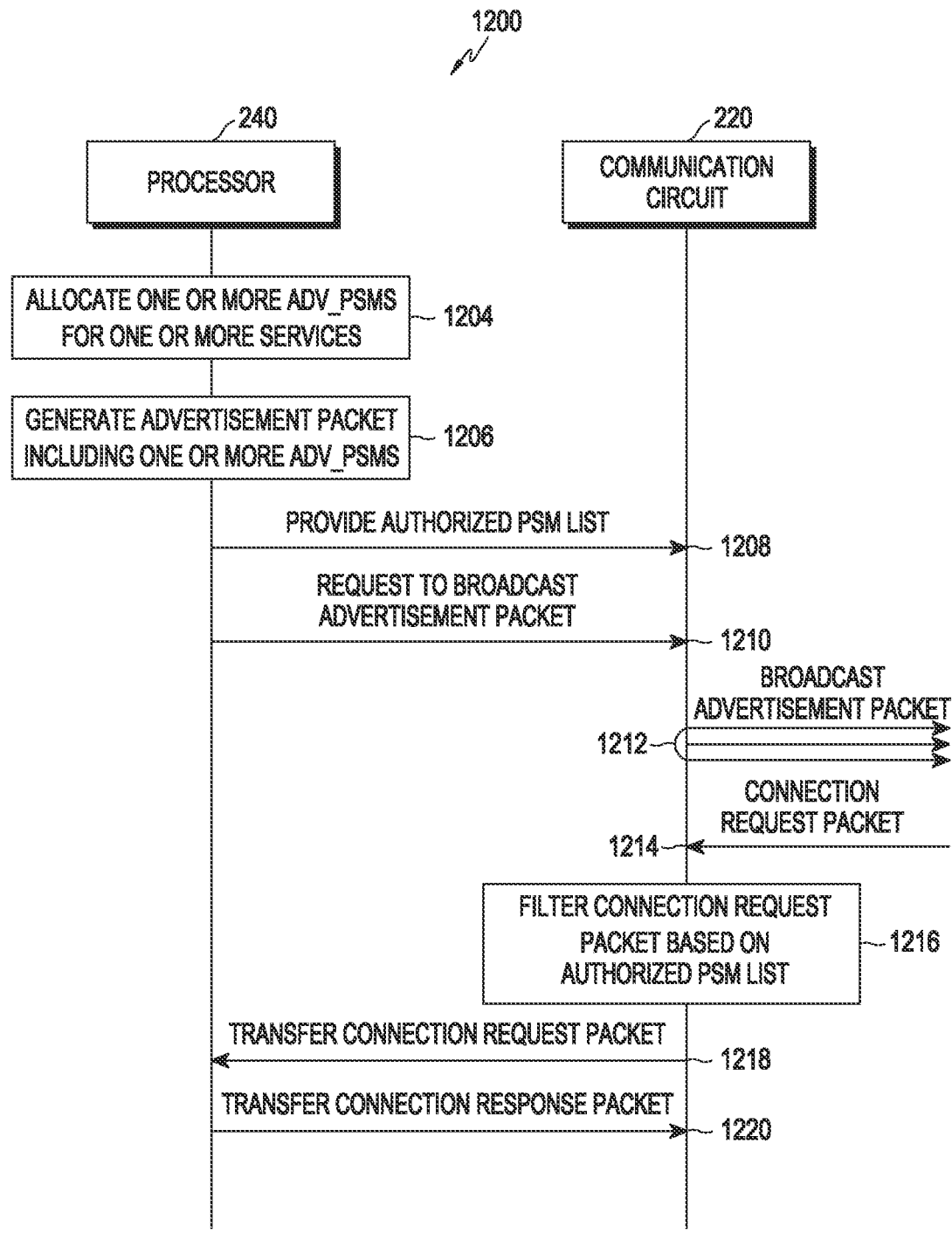
FIG. 12 is a signal flowchart schematically illustrating an operation of filtering a connection request packet in a BLE network according to an embodiment of the disclosure.

FIG. 12 is a signal flowchart 1200 schematically illustrating an operation of filtering a connection request packet in a BLE network according to an embodiment of the disclosure.

According to an embodiment of the disclosure, the operation of filtering the connection request packet in the electronic device 101 may be controlled by the operation of the processor 240 and the communication circuit 220 of the electronic device 101.

Referring to FIG. 12, in operation 1204, the processor 240 may allocate one or more ADV_PSMs for one or more services. For example, the processor 240 may initiate one or more service servers for providing one or more services, and may allocate one or more ADV_PSMs to be used for connection with the one or more service servers. In an embodiment of the disclosure, the one or more service servers may be initiated when one or more trigger events occur. In an embodiment of the disclosure, initiating one or more service servers may mean that the processor 240 starts an operation for providing one or more services.

In operation 1206, the processor 240 may generate at least one advertisement packet including one or more ADV_PSMs allocated to one or more services.

In operation 1208, the processor 240 may generate an authorized PSM list including one or more ADV_PSMs included in at least one advertisement packet, and may provide the authorized PSM list to the communication circuit 220.

In operation 1210, the processor 240 may request the communication circuit 220 to broadcast at least one advertisement packet. In operation 1212, the communication circuit 220 may broadcast at least one advertisement packet based on the request from the processor 240.

In operation 1214, the communication circuit 220 may receive one or more connection request packets from one or more external electronic devices. In operation 1216, the communication circuit 220 may perform a filtering operation on one or more connection request packets based on the authorized PSM list. In an embodiment of the disclosure, the filtering operation for the one or more connection request packets may include the following operations.

In an embodiment of the disclosure, the communication circuit 220 may detect whether one or more ADV_PSMs are included in one or more connection request packets. When the one or more connection packets do not include the one or more ADV_PSMs, the communication circuit may ignore the one or more connection request packets. For example, when one or more ADV_PSMs are not included in the one or more connection request packets, the communication circuit 220 may regard each of the one or more connection request packets as one for an inappropriate connection request, and may discard the one or more connection request packets without transmitting the one or more connection request packets to the processor 240.

In an embodiment of the disclosure, when the one or more ADV_PSMs are included in the one or more connection packets, the communication circuit 220 may detect whether the one or more ADV_PSMs included in the one or more connection packets are the same as the one or more ADV_PSMs included in the authorized PSM list.

In an embodiment of the disclosure, when the one or more ADV_PSMs included in the one or more connection packets are not the same as the one or more ADV_PSMs included in the authorized PSM list, the communication circuit 220 may ignore the one or more connection request packets. For example, when the one or more ADV_PSMs included in the one or more connection request packets are not the same as the one or more ADV_PSMs included in the authorized PSM list, the communication circuit 220 may regard the one or more connection request packets as ones for inappropriate connection requests and may discard the one or more connection request packets without transmitting the one or more connection request packets to the processor 240.

In an embodiment of the disclosure, when the one or more ADV_PSMs included in the one or more connection packets are the same as the one or more ADV_PSMs included in the authorized PSM list, the communication circuit 220 may transmit the one or more connection request packets to the processor 240 in operation 1218.

The processor 240 may determine whether to accept a connection request for one or more connection request packets transmitted from the communication circuit 220. In operation 1220, the processor 240 may transmit one or more connection response packets including information about whether to accept the connection request for the one or more connection request packets to the communication circuit 220. When the one or more connection response packets are transmitted, the communication circuit 220 may transmit the one or more connection response packets to one or more external electronic devices.

In an embodiment of the disclosure, the processor 240 may establish one or more channels for performing data packet transmission and/or reception operations with one or more external electronic devices. The data packet transmission and/or reception operation may include data packet transmission and/or reception operations for one or more services.

As described above, the communication circuit 220 may filter one or more inappropriate connection request packets based on the authorized PSM list. Accordingly, since the processor 240 does not perform operations that are unnecessary due to one or more inappropriate connection request packets, it is possible to prevent power waste due to unnecessary operations.

According to various embodiments of the disclosure, ADV_PSM included in the advertisement packet may be encrypted for security.

Figure 13:
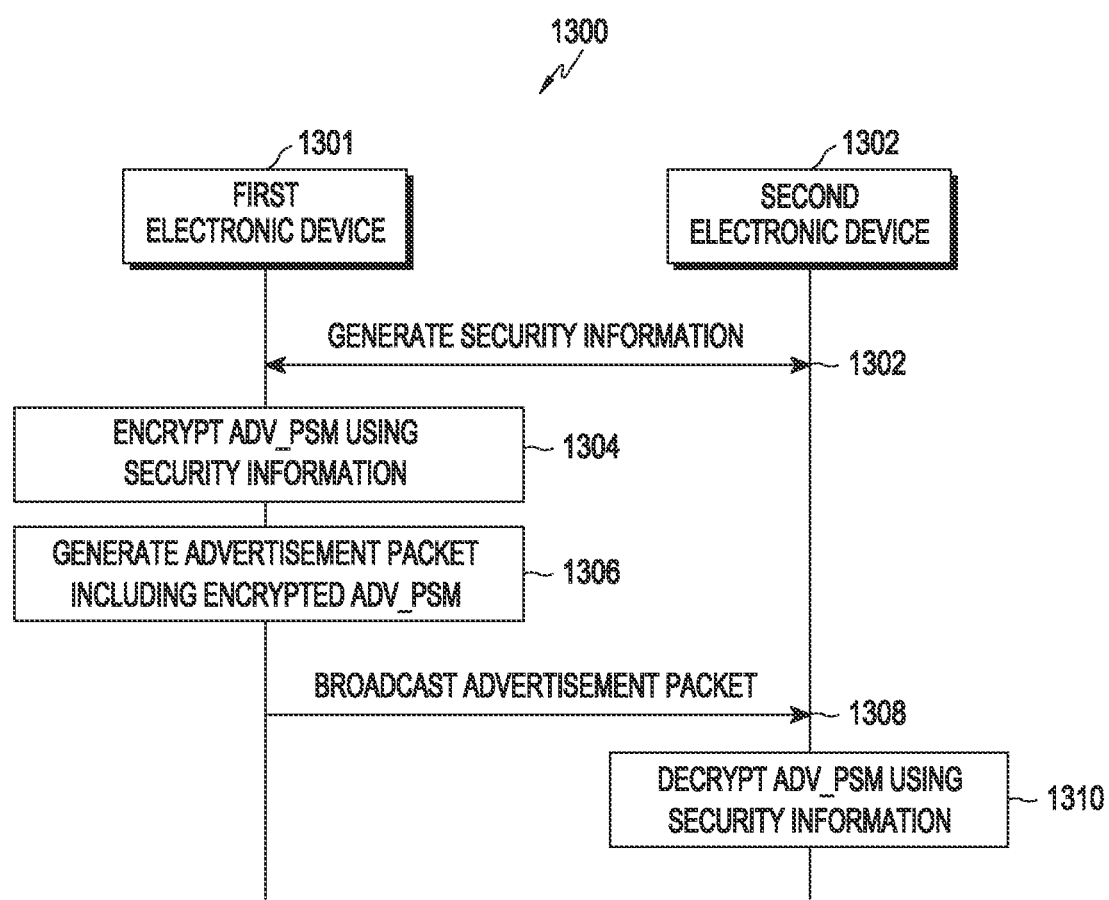
FIG. 13 is a signal flowchart schematically illustrating an operation of providing a security ADV_PSM in a BLE network according to an embodiment of the disclosure.

FIG. 13 is a signal flowchart 1300 schematically illustrating an operation of providing a security ADV_PSM in a BLE network according to an embodiment of the disclosure.

Referring to FIG. 13, a first electronic device 1301 may be an electronic device providing a service to which ADV_PSM is allocated, and a second electronic device 1302 may be an electronic device receiving a service to which ADV_PSM is allocated. The first electronic device 1301 and/or the second electronic device 1302 may be substantially the same electronic device as the electronic device 101 of FIG. 1.

Referring to FIG. 13, in operation 1302, the first electronic device 1301 and the second electronic device 1302 may generate security information for common use by the first electronic device 1301 and the second electronic device 1302. In an embodiment of the disclosure, when the users of the first electronic device 1301 and the second electronic device 1302 are the same, the first electronic device 1301 and the second electronic device 1302 may generate security information using the same user information (e.g., user account information).

In an embodiment of the disclosure, the first electronic device 1301 and the second electronic device 1302 may generate security information based on user information and a configured security algorithm. For example, the configured security algorithm may be a secure hash algorithm (SHA) 256. In this case, the user information may be used as an input value of the security function based on SHA 256, and the output value of the security function may be used to generate security information to be commonly used by the first electronic device 1301 and the second electronic device 1302.

Table 4 illustrates the result of inputting user information to the SHA256 function.

TABLE 4

| user information: |
| --- |
| 0xBB28562B02CFC0F9D15FC7460D6D369EE9ED4E3181159C5B152612E06D400F3B |
| SOURCE: SHA256(user information) = |
| 0xC1B4F92E4152FCDBF1A963801D4FB04D0DA588FEC2A09620D63009C4197D8D91 |

In Table 4, SHA256( ) may denote the security function based on SHA 256, user information may denote the input value of the security function, and SOURCE may denote the output value of the security function. According to an embodiment of the disclosure, some of the output values of the security function may be used as security information. For example, a value 0xC1B4 having the same length as the length (e.g., 2 bytes) of ADV_PSM in the output value of the security function may be used as security information. According to another embodiment of the disclosure, the information input to the SHA256 function may be at least one of date information or model information, instead of user information.

In operation 1304, the first electronic device 1301 may encrypt ADV_PSM based on the generated security information. In an embodiment of the disclosure, the first electronic device 1301 may encrypt ADV_PSM by performing an exclusive or XOR operation in bytes for the security information and ADV_PSM.

Table 5 illustrates an example in which the per-byte XOR operation result for security information (e.g., 0xC1B4) and ADV_PSM (e.g., 0x0081) is generated as a result of encrypting ADV_PSM (e.g., 0xC1 0x35 (0xC135)).

TABLE 5

| ADV_PSM: 0x0081 |
| --- |
| security information: 0xC1B4 |
| encrypted ADV_PSM [0]: 0x00 ^ 0xC1 = 0xC1, [1]: 0x81 ^ 0xB4 = 0x35 |

In operation 1306, the first electronic device 1301 may generate an advertisement packet including the encrypted ADV_PSM. In operation 1308, the first electronic device 1301 may broadcast the generated advertisement packet. In an embodiment of the disclosure, the broadcast advertisement packet may be received by the second electronic device 1302. The second electronic device 1302 may obtain the encrypted ADV_PSM from the received advertisement packet, and may decrypt the encrypted ADV_PSM based on the security information in operation 1310. In an embodiment of the disclosure, the second electronic device 1302 may decrypt the encrypted ADV_PSM by performing a per-byte XOR operation on the security information and the encrypted ADV_PSM.

Table 6 illustrates an example in which the per-byte XOR operation result for security information (e.g., 0xC1B4) and encrypted ADV_PSM (e.g., 0xC135) is generated as a result (e.g., 0x00 0x81 (0x0081)) of decrypting the encrypted ADV_PSM.

TABLE 6 encrypted ADV_PSM: 0xC135
security information: 0xC1B4
decrypted, encrypted ADV_PSM[0] : 0xC1 ^ 0xC1 = 0x00, [1] : 0x35 ^ 0xB4 = 0x81

In an embodiment of the disclosure, when ADV_PSM is decrypted, the second electronic device 1302 may transmit a connection request packet including the decrypted ADV_PSM to the first electronic device 1301. When the connection response packet including the information indicating that the connection request is accepted is received from the first electronic device 1301, the second electronic device 1302 may determine that the connection with the first electronic device 1301 is successful and may establish at least one channel for communication with the first electronic device 1301.

Hereinafter, an operation in which the first electronic device 1301 and the second electronic device 1302 establish a channel based on the encrypted ADV_PSM is described as an example according to various embodiments.

In an embodiment of the disclosure, when a trigger event occurs, the first electronic device 1301 may start an operation for providing a service and may generate an advertisement packet. For example, the first electronic device 1301 may generate an advertisement packet including service information, user account information, and ADV_PSM. The service information may be 2 bytes long, the user account information may be 6 bytes long, and the ADV_PSM may be 2 bytes long.

In an embodiment of the disclosure, the first electronic device 1301 may encrypt ADV_PSM to be included in the advertisement packet. For example, the first electronic device 1301 may generate security information based on the user account information and the configured security algorithm (e.g., SHA 256).

In an embodiment of the disclosure, ADV_PSM may be included in the ADV_PSM field 632 illustrated in FIG. 7A, and service information and user account information may be included in the data field 716. Unlike FIG. 7A, the data field 716 may be disposed ahead of the ADV_PSM field 632. Accordingly, the service information, the user account information, and the ADV_PSM may be included in the advertisement packet in the order of the service information, the user account information, and the ADV_PSM. The type field 630 may include information indicating that the data type included in the advertisement data field 632 is a type (e.g., a manufacturer-specific data type) including data configured by the first electronic device 1301.

In an embodiment of the disclosure, the second electronic device 1302 may receive the broadcast advertisement packet and may obtain information, such as "02 18 11 A1 F5 F9 11 5B CF 88 7E C8 A7 95" from the advertisement data field 711 of the received advertisement packet.

Considering that "service information (3 bytes)+user account information (6 bytes)+ADV_PSM (2 bytes)" are sequentially included, the second electronic device 1302 may identify the encrypted ADV_PSM (e.g., 7E C8) from the obtained information.

The second electronic device 1302 may decrypt the encrypted ADV_PSM by performing a per-byte XOR operation on the encrypted ADV_PSM and the security information configured in the same manner as the first electronic device 1301. In an embodiment of the disclosure, the second electronic device 1302 may transmit a connection request packet including the decrypted ADV_PSM (e.g., 0x0080) to the first electronic device 1301. When the connection response packet including the information indicating acceptance of the connection request packet is received, the second electronic device 1302 may determine that the connection with the first electronic device 1301 is successful.

According to an embodiment of the disclosure, a method for transmitting protocol/service information by an electronic device 101 or 501 may comprise broadcasting (506, 812, 1008, or 1212) an advertisement packet including at least one first protocol/service information (e.g., at least one ADV_PSM), receiving (510, 814, 1010, or 1218) a connection request packet including at least one second protocol/service information from an external electronic device 102 or 502, and transmitting (512, 816, 1014, or 1220) a connection response packet to the external electronic device when the at least one second protocol/service information is identical to the at least one first protocol/service information.

In various embodiments of the disclosure, the method may further comprise allocating at least one channel for transmitting and/or receiving at least one data packet to/from the external electronic device, transmitting information about the allocated at least one channel to the external electronic device, and transmitting and/or receiving the at least one data packet to/from the external electronic device on the allocated at least one channel.

In various embodiments of the disclosure, the advertisement packet may include a type field 630 and a data field 632. The type field 630 may include information indicating that data included in the data field 632 is data configured by the electronic device, and the data field 632 may include the at least one first protocol/service information 714 and product identifier (ID) information 712 about the electronic device.

In various embodiments of the disclosure, the data field 632 may further include at least one 716 of name information about the electronic device, user information about the electronic device, or user account information about the electronic device.

In various embodiments of the disclosure, the advertisement packet may include a type field 630 and a data field 632. The type field 630 may include information indicating that data included in the data field 632 is data configured by the electronic device, and the data field 632 may include the at least one first protocol/service information 724 and service identifier (ID) information 722 about the electronic device.

In various embodiments of the disclosure, the data field 632 may further include at least one 726 of user account information about the electronic device, service type information, service name information, service provider information, or service description information.

According to an embodiment of the disclosure, a method for receiving protocol/service information by an electronic device 101 or 502 may comprise receiving (506, 910, or 1110) an advertisement packet including at least one first protocol/service information (e.g., at least one ADV_PSM), generating (508, 916, or 1116) a connection request packet including at least one second protocol/service information identical to the at least one first protocol/service information 714 included in the advertisement packet, transmitting (510, 918, or 1118) the connection request packet to the external electronic device 102 or 501, and receiving (512, 920, or 1120) a connection response packet from the external electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a communication circuit; and
    at least one processor,
    wherein the at least one processor is configured to:
        broadcast an advertisement packet including at least one first protocol/service information through the communication circuit,
        receive a connection request packet including at least one second protocol/service information from an external electronic device through the communication circuit, and
        transmit a connection response packet to the external electronic device when the at least one second protocol/service information is identical to the at least one first protocol/service information.

2. The electronic device of claim 1, wherein the at least one processor is further configured to:
    allocate at least one channel for transmitting and/or receiving at least one data packet to/from the external electronic device;
    transmit information about the allocated at least one channel to the external electronic device through the communication circuit; and
    transmit and/or receive the at least one data packet to/from the external electronic device on the allocated at least one channel through the communication circuit.

3. The electronic device of claim 1,
    wherein the advertisement packet includes a type field and a data field,
    wherein the type field includes information indicating that data included in the data field is data configured by the electronic device, and
    wherein the data field includes the at least one first protocol/service information, product identifier (ID) information about the electronic device, and user account information about the electronic device.

4. The electronic device of claim 1,
    wherein the advertisement packet includes a type field and a data field,
    wherein the type field includes information indicating that data included in the data field is data configured by the electronic device, and
    wherein the data field includes the at least one first protocol/service information, service identifier (ID) information about the electronic device, and user account information about the electronic device.

5. The electronic device of claim 1, wherein the at least one processor is further configured to:
    generate encryption information based on user account information and a configured security algorithm;
    encrypt the first protocol/service information based on the generated encryption information;
    generate the advertisement packet including the user account information and the encrypted first protocol/service information; and
    broadcast the generated advertisement packet through the communication circuit.

6. An electronic device, comprising:
    a communication circuit; and
    at least one processor,
    wherein the at least one processor is configured to:
        receive an advertisement packet including at least one first protocol/service information from an external electronic device through the communication circuit,
        generate a connection request packet including at least one second protocol/service information identical to the at least one first protocol/service information included in the advertisement packet,
        transmit the connection request packet to the external electronic device through the communication circuit, and
        receive a connection response packet from the external electronic device through the communication circuit.

7. The electronic device of claim 6, wherein the at least one processor is further configured to:
    receive information about at least one channel allocated by the external electronic device through the communication circuit,
    establish the received at least one channel as at least one channel for communication with the external electronic device; and
    transmit and/or receive at least one data packet to/from the external electronic device on the established at least one channel through the communication circuit.

8. The electronic device of claim 6,
    wherein the advertisement packet includes a type field and a data field,
    wherein the type field includes information indicating that data included in the data field is data configured by the external electronic device, and
    wherein the data field includes the at least one first protocol/service information, product identifier (ID) information about the external electronic device, and user account information about the external electronic device.

9. The electronic device of claim 6,
    wherein the advertisement packet includes a type field and a data field,
    wherein the type field includes information indicating that data included in the data field is data configured by the external electronic device, and
    wherein the data field includes the at least one first protocol/service information, service identifier (ID) information about the external electronic device, and user account information about the external electronic device.

10. The electronic device of claim 6, wherein the at least one processor is further configured to:

when the at least one first protocol service information is encrypted, generate decryption information based on a preset security algorithm and user account information included in the advertisement packet; and decrypt the encrypted at least one first protocol service information based on the generated decryption information.

11. A method for transmitting protocol/service information by an electronic device, the method comprising:

broadcasting an advertisement packet including at least one first protocol/service information;

receiving a connection request packet including at least one second protocol/service information from an external electronic device; and transmitting a connection response packet to the external electronic device when the at least one second protocol/service information is identical to the at least one first protocol/service information.

12. The method of claim 11, further comprising:

allocating at least one channel for transmitting and/or receiving at least one data packet to/from the external electronic device;

transmitting information about the allocated at least one channel to the external electronic device through a communication circuit; and transmitting and/or receive the at least one data packet to/from the external electronic device on the allocated at least one channel through the communication circuit.

13. The method of claim 12, wherein the advertisement packet includes a type field and a data field, wherein the type field includes information indicating that data included in the data field is data configured by the electronic device, and wherein the data field includes the at least one first protocol/service information, product identifier (ID) information about the electronic device, and user account information about the electronic device.

14. The method of claim 13, wherein the advertisement packet includes a type field and a data field, wherein the type field includes information indicating that data included in the data field is data configured by the electronic device, and wherein the data field includes the at least one first protocol/service information, service identifier (ID) information about the electronic device, and user account information about the electronic device.

15. The method of claim 14, further comprising:

generating encryption information based on user account information and a configured security algorithm;

encrypting the first protocol/service information based on the generated encryption information;

generating the advertisement packet including the user account information and the encrypted first protocol/service information; and broadcasting the generated advertisement packet through a communication circuit.

16. A method for receiving protocol/service information by an electronic device, the method comprising:

receiving an advertisement packet including at least one first protocol/service information from an external electronic device;

generating a connection request packet including at least one second protocol/service information identical to the at least one first protocol/service information included in the advertisement packet;

transmitting the connection request packet to the external electronic device; and receiving a connection response packet from the external electronic device.

17. The method of claim 16, further comprising:

receiving information about at least one channel allocated by the external electronic device through a communication circuit;

establishing the received at least one channel as at least one channel for communication with the external electronic device; and transmitting and/or receive at least one data packet to/from the external electronic device on the established at least one channel through the communication circuit.

18. The method of claim 17, wherein the advertisement packet includes a type field and a data field, wherein the type field includes information indicating that data included in the data field is data configured by the external electronic device, and wherein the data field includes the at least one first protocol/service information, product identifier (ID) information about the external electronic device, and user account information about the external electronic device.

19. The method of claim 18, wherein the advertisement packet includes a type field and a data field, wherein the type field includes information indicating that data included in the data field is data configured by the external electronic device, and wherein the data field includes the at least one first protocol/service information, service identifier (ID) information about the external electronic device, and user account information about the external electronic device.

20. The method of claim 19, further comprising:

when the at least one first protocol service information is encrypted, generating decryption information based on a preset security algorithm and user account information included in the advertisement packet; and decrypting the encrypted at least one first protocol service information based on the generated decryption information.

* * * * *